United States Patent
Alapati et al.

(10) Patent No.: US 12,247,516 B2
(45) Date of Patent: Mar. 11, 2025

(54) COUNTER-ROTATING GAS TURBINE ENGINES INCLUDING TURBINE SECTIONS WITH SEPARABLE TORQUE FRAMES

(71) Applicants: General Electric Company, Schenectady, NY (US); GE Avio S.r.l., Rivalta di Torino (IT)

(72) Inventors: Ranganayakulu Alapati, Bangalore (IN); Peeyush Pankaj, Bangalore (IN); Sanjeev Sai Kumar Manepalli, Bangalore (IN); Bhaskar Nanda Mondal, Bangalore (IN); Thomas Moniz, Loveland, OH (US); N V Sai Krishna Emani, Bengaluru (IN); Shishir Paresh Shah, Bangalore (IN); Anil Soni, Bengaluru (IN); Praveen Sharma, Bangalore (IN); Randy T. Antelo, Silverthorne, CO (US); Antonio Giuseppe D'Ettole, Rivoli (IT)

(73) Assignees: General Electric Company, Evendale, OH (US); GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 17/955,713

(22) Filed: Sep. 29, 2022

(65) Prior Publication Data
US 2024/0110504 A1    Apr. 4, 2024

(51) Int. Cl.
*F02C 3/067*    (2006.01)
*F02C 3/10*    (2006.01)

(52) U.S. Cl.
CPC ............... *F02C 3/067* (2013.01); *F02C 3/10* (2013.01); *F05D 2220/323* (2013.01); *F05D 2240/24* (2013.01)

(58) Field of Classification Search
CPC ...... F02C 3/067; F02C 3/10; F05D 2220/323; F05D 2240/24; F01D 5/02; F01D 5/025;
(Continued)

(56) References Cited

U.S. PATENT DOCUMENTS 2,801,822 A    8/1957  Speed
4,361,416 A    11/1982 Rossmann
(Continued)

FOREIGN PATENT DOCUMENTS

CH    322010 A    5/1957
EP    1201878 B1  5/2002
(Continued)

*Primary Examiner* — Steven M Sutherland
(74) *Attorney, Agent, or Firm* — Dinsmore & Shohl LLP

(57) ABSTRACT

A gas turbine engine includes a fan located at a forward portion of the gas turbine engine, and a compressor section and a turbine section arranged in serial flow order. The compressor section and the turbine section together define a core airflow path. A rotary member is rotatable with the fan and with a low pressure turbine of the turbine section. The low pressure turbine includes a rotating drum to which a first airfoil structure is connected and extends radially inward toward the rotary member. A torque frame connects the rotating drum to the rotary member and transfers torque from the first airfoil structure mounted to the rotating drum to the rotary member. The torque frame includes an inner disk mounted to the rotary member, an outer ring and a second airfoil structure formed separately from the outer ring and connected thereto by a releasable connecting structure. The second airfoil structure extends radially inward from the outer ring toward the inner disk.

10 Claims, 22 Drawing Sheets

(58) Field of Classification Search
CPC ... F01D 5/03; F01D 5/06; F01D 5/066; F01D 9/042
See application file for complete search history.

(56) References Cited

U.S. PATENT DOCUMENTS

| | | | |
|---|---|---|---|
| 5,211,537 | A | 5/1993 | Langston et al. |
| 5,307,622 | A * | 5/1994 | Ciokajlo ............... F02C 3/067 416/128 |
| 5,492,447 | A * | 2/1996 | Mannava ............ B23K 26/356 416/198 A |
| 7,063,505 | B2 | 6/2006 | Czachor |
| 7,862,296 | B2 | 1/2011 | Finneran et al. |
| 8,176,598 | B2 | 5/2012 | Casavant et al. |
| 8,267,646 | B2 | 9/2012 | Robertson |
| 9,039,376 | B2 | 5/2015 | Udall et al. |
| 9,683,459 | B2 | 6/2017 | Aoki et al. |
| 10,731,484 | B2 | 8/2020 | Bordne et al. |
| 10,844,747 | B2 | 11/2020 | Barow et al. |
| 2003/0200741 | A1 * | 10/2003 | Moniz .................... F01D 5/022 60/268 |
| 2006/0093466 | A1 * | 5/2006 | Seda ..................... F16C 17/18 415/68 |
| 2019/0093489 | A1 | 3/2019 | Mondal et al. |

FOREIGN PATENT DOCUMENTS

| | | |
|---|---|---|
| FR | 2681374 A1 | 3/1993 |
| GB | 695221 A | 8/1953 |

\* cited by examiner

COUNTER-ROTATING GAS TURBINE ENGINES INCLUDING TURBINE SECTIONS WITH SEPARABLE TORQUE FRAMES

BACKGROUND

Field

The present specification generally relates to gas turbine engines and, more specifically, to gas turbine engines that include turbine sections with separable torque frames.

Technical Background

Gas turbine engines are frequently used as part of aircraft propulsion systems. Gas turbine engines may include a compressor section, a combustion section, a turbine section and an exhaust section. Air is provided by a fan to the compressor section where the air is compressed and delivered to the combustion section. In the combustion section, the air is mixed with fuel and then burned. The combustion gases are then delivered to the turbine section, which drives the turbine section before delivering the combustion gases to the exhaust section.

The turbine section generally includes a high pressure turbine (HPT) and a low pressure turbine (LPT). Energy is extracted from the combustion gases in the HPT, which powers the compressor section through an interconnecting spool. Additional energy is extracted from the combustion gases in the LPT, which powers the fan and other systems, such as the compressor section, through a second spool.

Counter-rotating turbines can provide some enhancements in performance over conventional co-rotating turbines. The counter-rotating turbines may include turbine sections having interdigitated stages without any stators between the stages (i.e., vaneless). Vaneless counter-rotating turbines (VCRTs), for example, can have a reduced overall stage length compared to co-rotating turbines with vaned stages. A torque frame is a structure that can be used to transfer torque from one of the turbine sections to the respective spool so that the spool rotates with the associated turbine section.

It is desirable to provide other torque frame structures that include separable components.

DETAILED DESCRIPTION

Embodiments described herein are generally directed to gas turbine engines that include turbine sections with a torque frame that transfers torque to rotary members. The gas turbine engines may include a compressor section and a turbine section arranged in serial flow order and together define a core airflow path. A rotary member, such as a shaft, spool, etc., is rotatable with at least portions of the compressor section and turbine section. The turbine section includes a rotating drum to which an airfoil structure is connected. A torque frame connects the rotating drum to the rotary member and transfers torque from the airfoil structure mounted to the rotating drum to the rotary member. The torque frame includes an inner ring mounted to the rotary member, an outer ring and a structural member that extends radially and connects the outer ring and the inner disk. An airfoil structure is formed separately from the outer ring and is connected thereto by a connecting structure. The airfoil structure extends radially from the outer ring toward the inner disk.

The structural members of the rotating torque frame transfer reaction loads from combustion gases within the flowpath of the engine, such as loads along the axial or longitudinal direction. The structural members further transfer radial and circumferential loads from the drum to which the torque frame is attached. In some embodiments, the outer ring provides structural support, such as defining an annular ring surrounding the outer ring to which the outer drum is coupled. In some embodiments, the torque frame further includes connecting members positioned along the circumferential direction that couple the outer ring to the outer drum.

Figure 1:
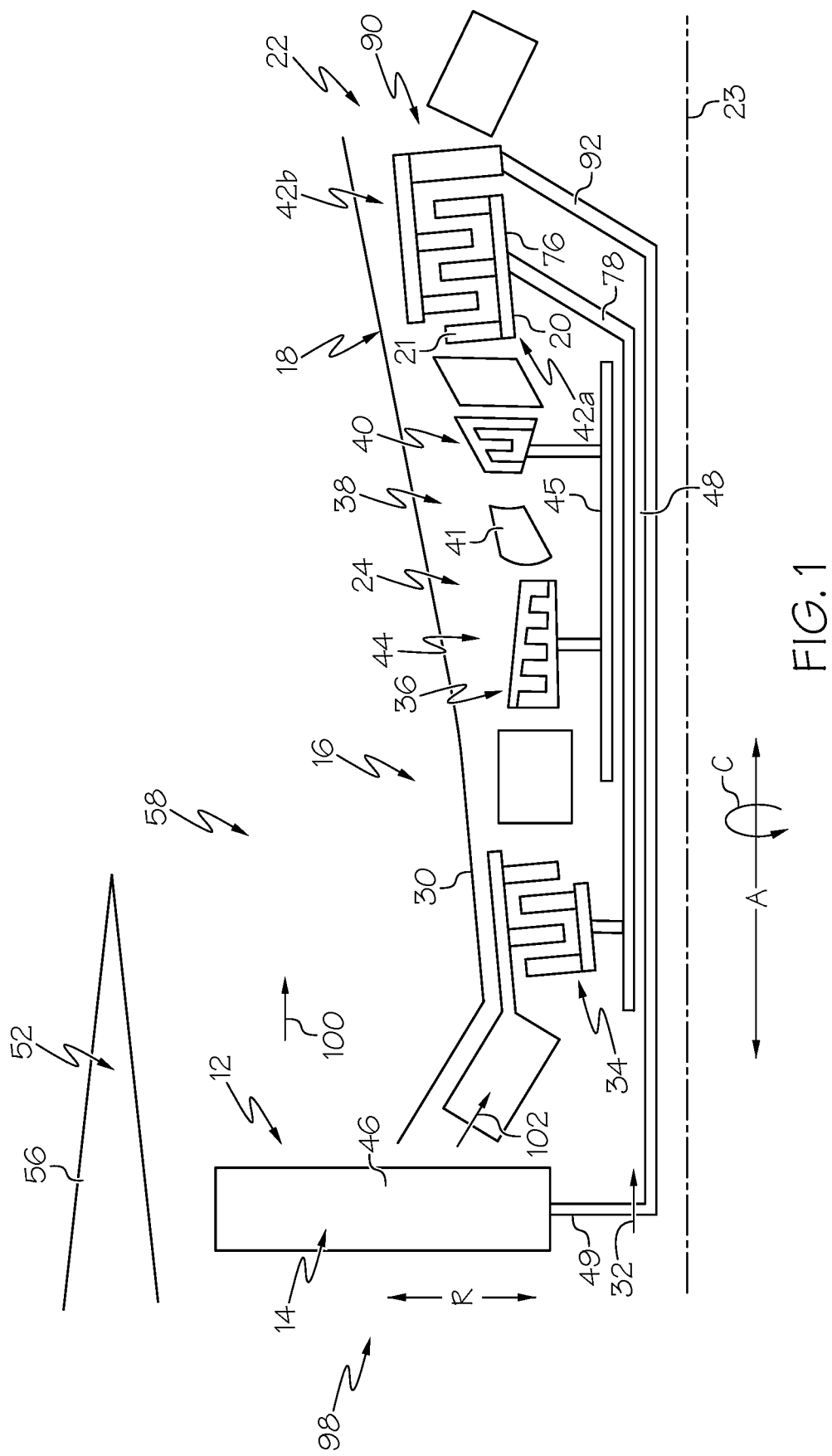
FIG. 1 is a diagrammatic section view of a gas turbine engine, according to one or more embodiments shown and described herein.

Referring to FIG. 1, an exemplary gas turbine engine 10 may be configured for wing or fuselage mounting on an aircraft. In some embodiments, the gas turbine engine 10 may also be used to provide electrical power. The gas turbine engine 10 includes a fan section 12 including a fan 14, a compressor section 16 and a turbine section 18. The fan section 12, compressor section 16 and turbine section 18 may include one or more rotor disks 20 that include rotor blades 21 extending radially therefrom. Air is drawn into the gas turbine engine 10 and accelerated by the fan 14. The air, or at least a portion thereof, is compressed in the compressor section 16 and is delivered to a combustion chamber 41 where the air is mixed with fuel and combusted thereby generating hot combustion gas. The combustion gases pass through the turbine section 18, which extracts mechanical work from the combustion gases to cause the attached compressor section 16 to turn and thereby further compress the upstream air to produce a self-sustaining process. The combustion gas is exhausted through a nozzle section 22.

The gas turbine engine 10 defines an axial direction A that extends parallel to a longitudinal centerline 23, a radial direction R that extends perpendicular to the axial direction A, and a circumferential direction C that extends about the axial direction A. The gas turbine engine 10 includes the fan section 12 and a core section 24 that is located downstream of the fan section 12 in the axial direction.

The gas turbine engine 10 includes a tubular core cowl 30 that defines, at least in part, an annular inlet 32. The core cowl 30 encases, in serial flow relationship, the compressor section 16 including a booster or low pressure (LP) compressor 34 and a high pressure (HP) compressor 36, a combustion section 38 that includes the combustion chamber, the turbine section 18 including a high pressure (HP) turbine 40 and a low pressure (LP) turbine 42, and the jet exhaust nozzle section 22. The compressor section 16, combustion section 38, and turbine section 18 together define a core airflow path 44 extending from the annular inlet 32 through the LP compressor 34, HP compressor 36, combustion section 38, and HP turbine 40. A first rotary member 45 (e.g., shaft or spool) drivingly connects the HP turbine 40 to the HP compressor 36. A second rotary member 48 drivingly connects the LP turbine 42 to the LP compressor 34. A third rotary member 51 connects the LP turbine 42 to the fan 14. Other configurations are possible as the any of the rotary members may be connected to any of the compressors and/or fan, depending on the engine architecture and design needs. As will be described in greater detail below, LP turbine 42 includes high speed (HS) and low speed (LS) turbines 42a and 42b that are interdigitated and counter-rotating in that they rotate in opposite directions. Further, the illustrated LP turbine 42 is vaneless in that it does not include stators between its HS and LS stages.

The fan section 12 includes the fan 14 having a plurality of fan blades 46 coupled to a disk 49 in a spaced apart manner. The fan blades 46 extend outwardly from disk 49 generally along the radial direction R. The disk 49 may be covered by rotatable front hub that is aerodynamically contoured to promote an air flow through the plurality of fan blades 46. The exemplary fan section 12 includes an annular fan casing or outer nacelle 52 that circumferentially surrounds the fan 14 and/or at least a portion of the core section 24. The outer nacelle 52 is supported relative to the core section 24 by a plurality of circumferentially-spaced struts that can also serve as outlet guide vanes. A downstream section 56 of the outer nacelle 52 extends over an outer portion of the core cowl 30 to define a bypass airflow passage 58 therebetween.

The gas turbine engine 10 depicted in FIG. 1 is provided by way of example only. In other exemplary embodiments the gas turbine engine 10 may be replaced with other types of gas turbine engines utilizing an embedded electrical machine without loss of clarity. Examples include a turboprop engine, a turbojet engine, an open rotor, or inducted fan engine.

Figure 2:
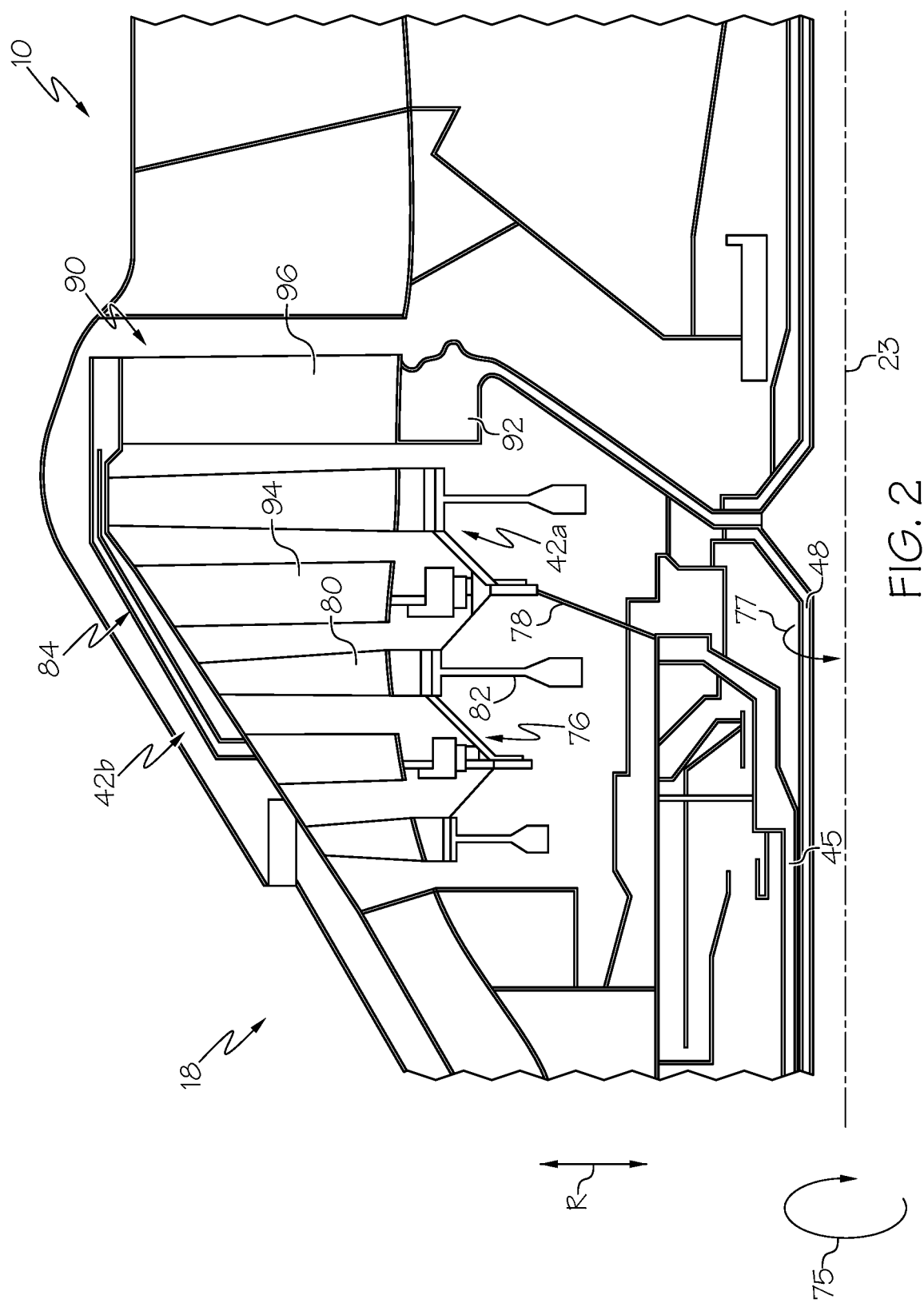
FIG. 2 is a diagrammatic section view of a portion of the gas turbine engine of FIG. 1, according to one or more embodiments shown and described herein.

Referring to FIG. 2, a diagrammatic section view of a portion of the gas turbine engine 10 is illustrated showing the turbine section 18. The turbine section 18 includes the HS turbine 42a and the LS turbine. The HS turbine 42a rotates in a first direction represented by arrow 75 at a relatively high speed and the LS turbine 42b rotates in an opposite, second direction represented by arrow 77 at a relatively lower speed. It should be noted that in other embodiments, turbine 42a may be considered the low speed turbine and turbine 42b may be considered the high speed turbine, depending on the engine architecture and design needs. The HS turbine 42a includes an inner drum 76 that is connected to the first rotary member 45 via an inner support member 78 such that the inner drum 76 rotates the first rotary member 45. A plurality of HS airfoils 80 are mounted on a plurality of turbine disks 82 that are connected to the inner drum 76 such that the turbine disks 82 and HS airfoils 80 rotate the first rotary member 45. The HS airfoils 80 generally extend in the radial direction R toward an outer drum 84.

The LS turbine 42b includes the outer drum 84 that is connected to and supported by a torque frame 90. The torque frame 90 is connected to the second rotary member 48 by an inner disk 92 such that the outer drum 84 rotates the second rotary member 48. A plurality of LS airfoils 94 are mounted to the outer drum 84 such that the LS airfoils 94 rotate the outer drum 84. The LS airfoils 94 generally extend in the radial direction R toward the inner drum 76.

The airfoils 80 and 94 of the HS and LS turbines 42a and 42b may define one or more stages, such as between one and 12. In the illustrated embodiment, each circular row of the airfoils 80 and 94 may define a stage and a structural member 96 of the torque frame 90 may define a stage. Further, there may be additional HS and LS turbines, for example, connected to one or more other rotary members.

Referring to FIGS. 1 and 2, during operation of the gas turbine engine 10, a volume of air enters the engine through an associated inlet 98 of the outer nacelle 52 and fan 14. As the air passes across the fan blades 46, a portion of the air as indicated by arrow 100 is directed or routed into the bypass airflow passage 58 while another portion of the air as indicated by arrow 102 is directed or routed through the fan 14 and the through the inlet 32. The air is progressively compressed as it flows through the compressor section 16 toward the combustion section 38.

The now compressed air, as indicated by arrow 104, flows into the combustion section 38 where a fuel is introduced, mixed with at least a portion of the compressed air, and ignited to form combustion gases. The combustion gases flow into the turbine section 18, causing the HS and LS turbine rotor assemblies 42a and 42b to rotate in opposite directions and support operations of the first and second rotary members 45 and 48 and their associated HP and LP compressors 36 and 34 and fan 14.

Figure 3:
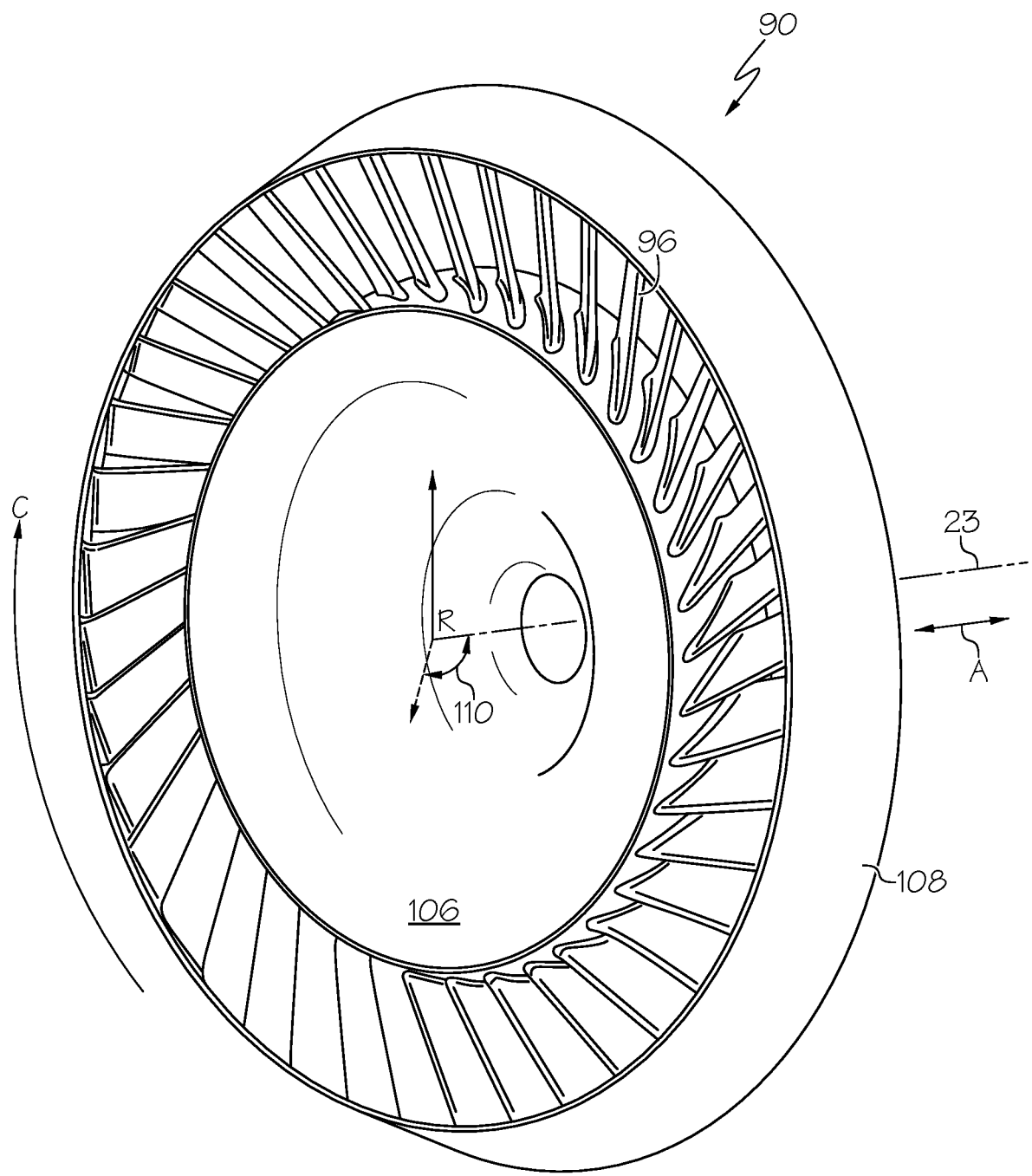
FIG. 3 is a perspective view of a torque frame for use with the gas turbine engine of FIG. 2, according to one or more embodiments shown and described herein.

Referring now to FIG. 3, the torque frame 90 is illustrated in isolation and includes an inner disk 106, an outer ring 108 and a plurality of the structural members 96. The structural members 96 extend generally in the radial direction R and couple the inner disk 106 to the outer ring 108. The inner disk 106 connects to the third rotary member 51.

In embodiments, the structural members 96 each define an airfoil structure having a pressure side, a suction side, a leading edge, and a trailing edge. The structural members 96 are generally configured to enable rotation of the torque frame 90. For example, the torque frame 90 may be part of the LS turbine rotor assembly 42b and rotate at a first rate of speed with the outer drum 84.

The structural members 96 may define a lean angle 110 relative to axial centerline 23 and radial direction R. In some embodiments, the lean angle 110 is defined in which an outer end of the structural members 96 is disposed upstream of an inner end of the structural members 96. For example, the lean angle 110 may be defined as 90 degrees or greater relative to the axial centerline 23. In some embodiments, the lean angle 110 may be less than 180 degrees relative to the axial centerline 23. In some embodiments, the lean angle 110 may be approximately 90 degrees relative to the axial centerline 23.

In the embodiment shown in FIG. 3, the structural members 96 may define the lean angle 110 in which the structural member 96 is extended. The lean angle 110 may counteract or offset centrifugal loads on the torque frame 90 during rotation of the LS turbine rotor assembly 42b. The lean angle 110 may enable the structural members 96 to counteract or offset axial loads during operation of the engine 10, such as due to rotation of the LS turbine rotor assembly 42b including the torque frame 90. The lean angle 110 may further enable the structural members 96 to counteract or offset axial loads resulting from the flow of combustion gases through the core airflow path 44. In some embodiments, the structural members 96 and/or the outer may each define a generally perpendicular or acute lean angle 110 in which one or more of the structural members 96 extend generally radially outward from the axial centerline 23.

As described herein, the torque frame 90 is configured to extract work or energy from the combustion gases to enable rotation of the LS turbine 42b. Still further, the torque frame 90, using the structural members 96, is configured to transfer reaction loads from combustion gases flowing axially within the core airflow path 44 of the engine 10. The structural members 96 further transfer loads along the radial direction R and the circumferential direction C from the outer drum 84.

Figure 4:
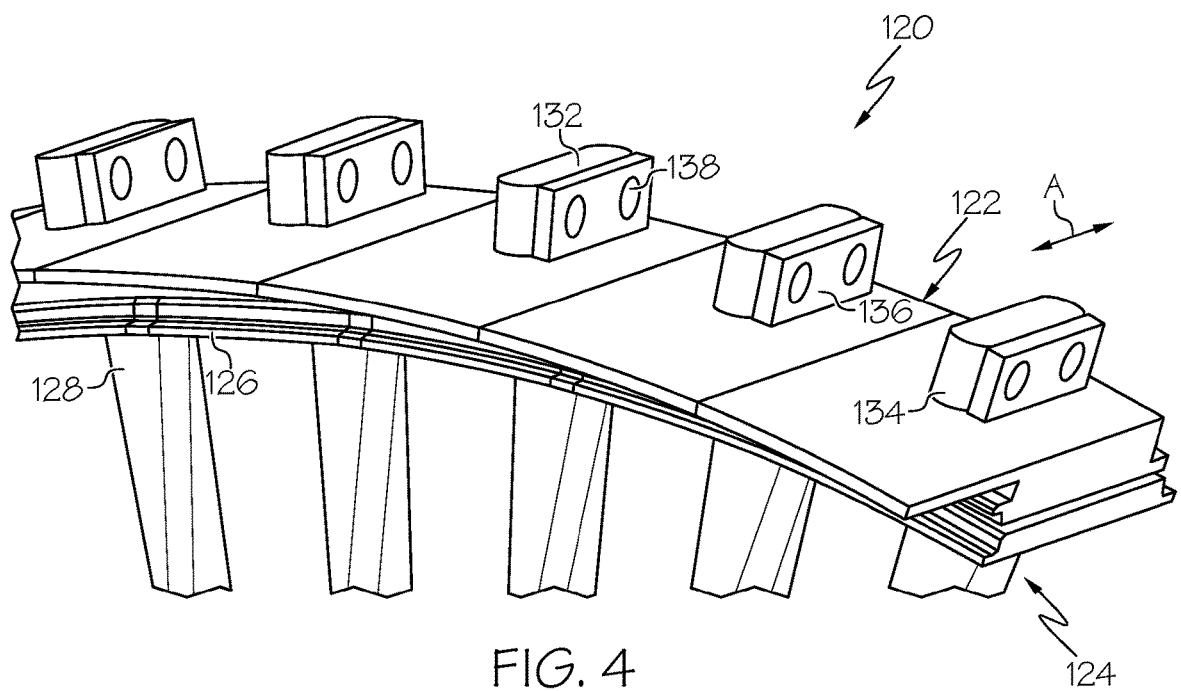
FIG. 4 is a diagrammatic, cross-sectional perspective view of a portion of a torque frame, according to one or more embodiments shown and described herein.

Referring to FIG. 4, a perspective sectional view of a portion of a separable torque frame 120 is illustrated that includes many of the components of the torque frame 90 including an outer ring 122 and structural members 124 in the form of airfoils. As one example, each structural member 124 may include an outer tip plate 126 an airfoil structure 128 that connects to an inner disk 130 (see FIG. 3). The structural members 124 may be formed as separate components that are assembled to the outer ring 122 using attachment tabs 132 that project radially outward from the outer tip plates 126. In some embodiments, groups of two or more structural members 124 defining sections of the torque frame 120 may be formed together as a single monolithic piece that is attached to the outer ring 122 using the attachment tabs 132. It should be noted that, in embodiments described herein, the outer ring 122 may be formed by or monolithic with an outer drum.

In the illustrated example, the attachment tabs 132 are elongated in the axial direction A and extend through openings 134 through the outer ring 122 located adjacent radially extending studs 136. The attachment tabs 132 may be mounted to the studs 136 using bolts 138 that are oriented tangentially to the circumference of the outer ring 122. Because the outer ring 122 is a single, monolithic structure, loads generated during operation are transferred through the outer ring 122 and studs 136 and not through the bolts 138. Having the bolts 138 at the outer diameter of the outer ring 122 can provide open spaces for tooling to facilitate repair and replacement of the structural members 124. Additionally, the structural members 124 can be preloaded as they are assembled into the outer ring 122.

Figure 5:
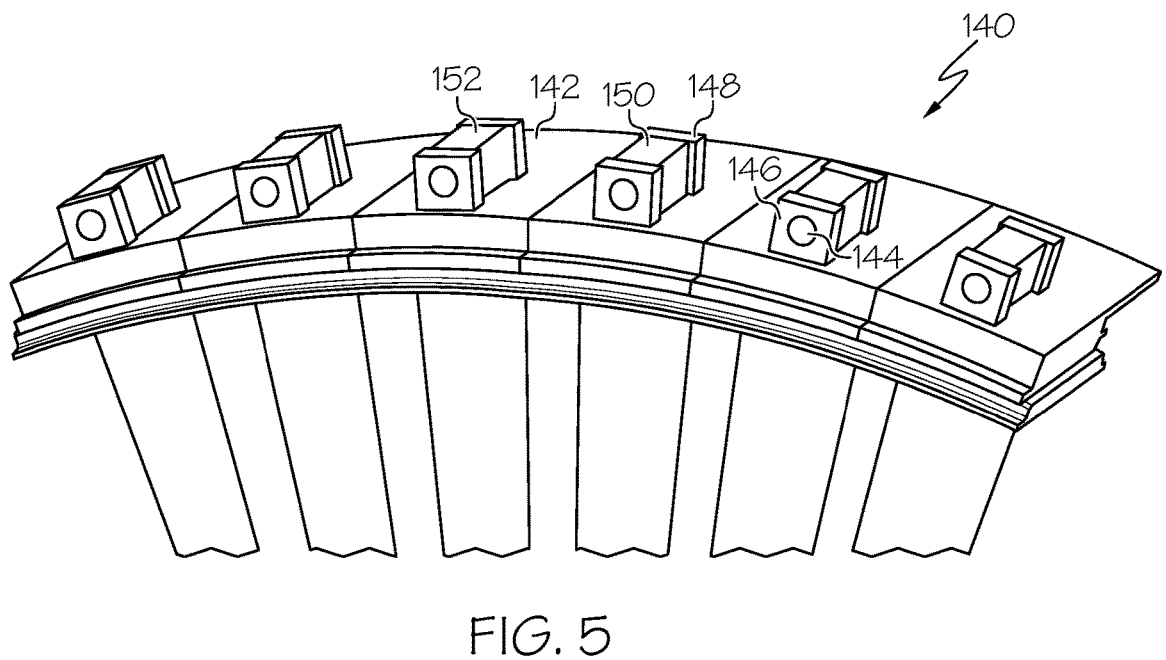
FIG. 5 is a diagrammatic, cross-sectional perspective view of a portion of a torque frame, according to one or more embodiments shown and described herein.
Figure 6:
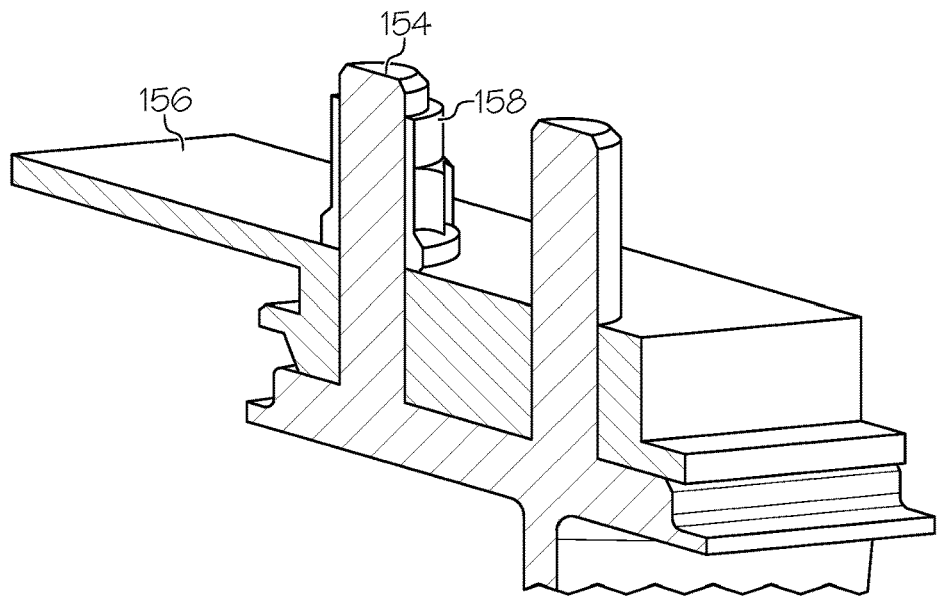
FIG. 6 is a diagrammatic, cross-sectional perspective view of a portion of a torque frame, according to one or more embodiments shown and described herein.

Referring to FIG. 5, in another example, an outer ring 142 of another torque frame 140 example includes axially-oriented bolts 144 that extend through studs 146 and 148. The studs 146 and 148 are located at opposite sides of an attachment tab 150. The attachment tab 150 extends through an opening 152 that is located between the studs 146 and 148. Referring to FIG. 6, in another example, radially extending tabs 154 may be connected to an outer ring 156 using fasteners 158.

Figure 7:
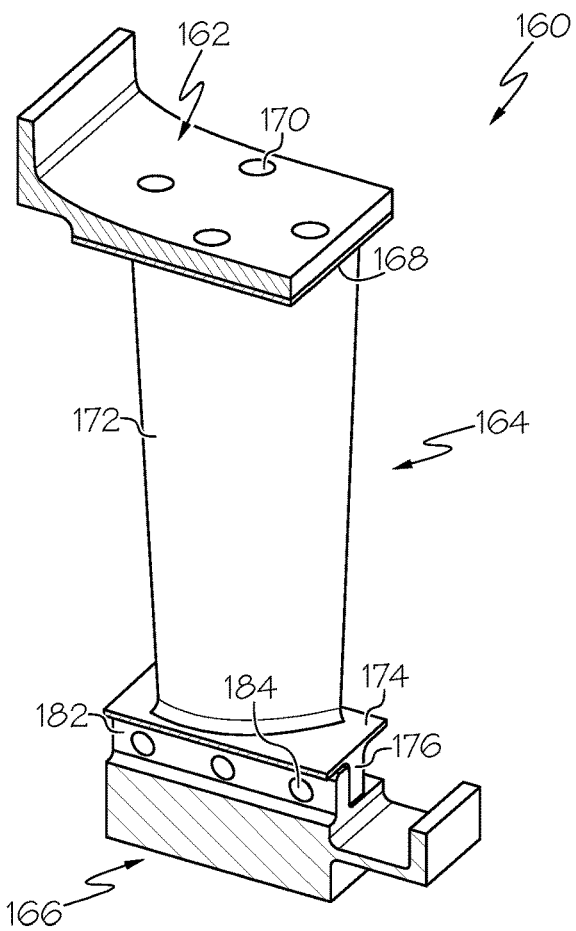
FIG. 7 is a diagrammatic, cross-sectional perspective view of a portion of a torque frame, according to one or more embodiments shown and described herein.
Figure 8:
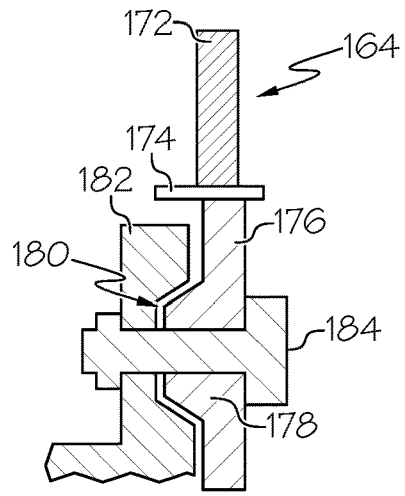
FIG. 8 is a diagrammatic, cross-sectional perspective view of a portion of a torque frame, according to one or more embodiments shown and described herein.

Referring now to FIG. 7, in some embodiments, a torque frame 160 includes separable outer ring 162, structural member 164 and inner disk 166. Only portions of the outer ring 162 and inner disk 166 are shown. In this example, the outer ring 162 is bolted to an outer tip plate 168 through its circumference by radially extending bolts 170. Referring also to FIG. 8, the structural member 164 includes an airfoil structure 172 with inner and outer tip plates 174 and 168, respectively, at opposite ends. Radially inside the inner tip plate 174 is a radially extending mounting flange 176 that includes a rib 178 (FIG. 8) that extends radially outward to be received within a groove 180 of a corresponding mounting flange 182 of the inner disk 166. Tangentially-oriented bolts 184 may pass through the mounting flanges 176 and 182. More than one bolt 184 may be used to improve the overturning moment stiffness of the torque frame 160. As represented by broken lines, the mounting flanges 176, 182 may be angled to the radial direction to accommodate R a desired lean angle for the airfoil structure 172.

Figure 9:
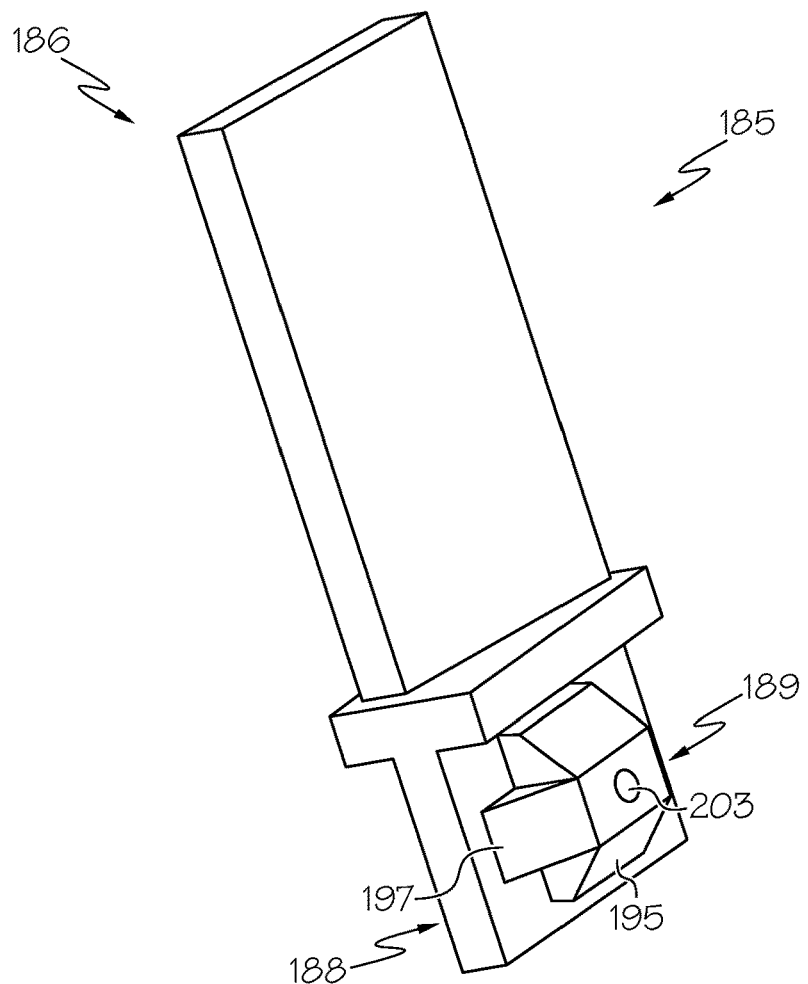
FIG. 9 is a diagrammatic perspective view of a structural member for a torque frame, according to one or more embodiments shown and described herein.
Figure 10:
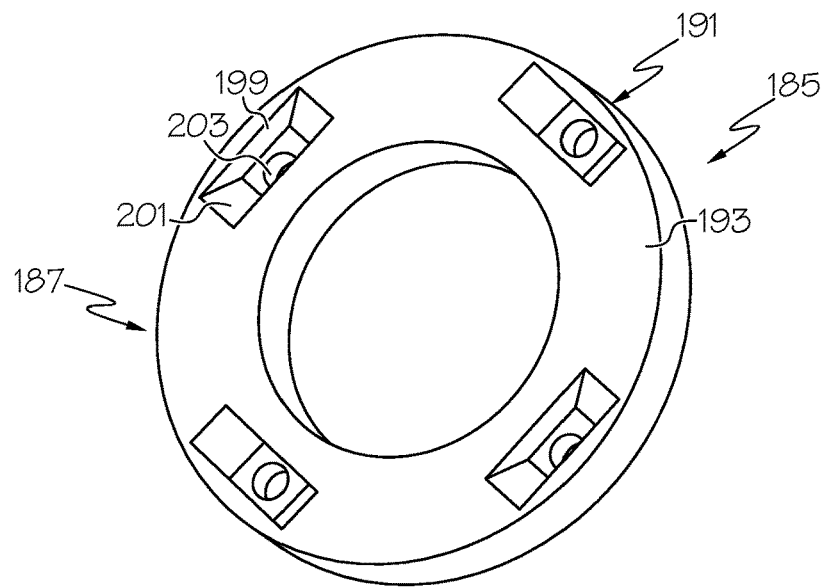
FIG. 10 is a side view of an inner disk that mates with the structural member of FIG. 9, according to one or more embodiments shown and described herein.

FIGS. 9 and 10 illustrate another embodiment of components of a torque frame 185 that includes a structural member 186 (FIG. 9) that is separable from an inner disk 187 (FIG. 10). The structural member 186 may again include an airfoil structure and a radially extending mounting flange 188. The radially extending mounting flange 188 includes a rib 189 that extends axially outward to be received within a slot 191 formed into a side 193 of the inner disk 187. Unlike the groove 180 of the inner disk 166 of FIGS. 7 and 8, the slot 191 is formed in the inner disk 187 and not within a mounting flange. Referring to FIG. 9, the rib 189 may include radial and circumferential wedged surfaces 195 and 197 and the slot 191 may include corresponding wedged surfaces 199 and 201. The wedged surfaces 195, 197, 199 and 201 may help carry the radial and torque loads during operation. Bolts may be placed through openings 203 to connect the rib 189 within the groove 180 and pre-load the structural member 186 and inner disk 187. While all the slots 191 are shown at side 193, the slots may be on both sides of the inner disk, e.g., to balance the center of gravity.

Figure 11:
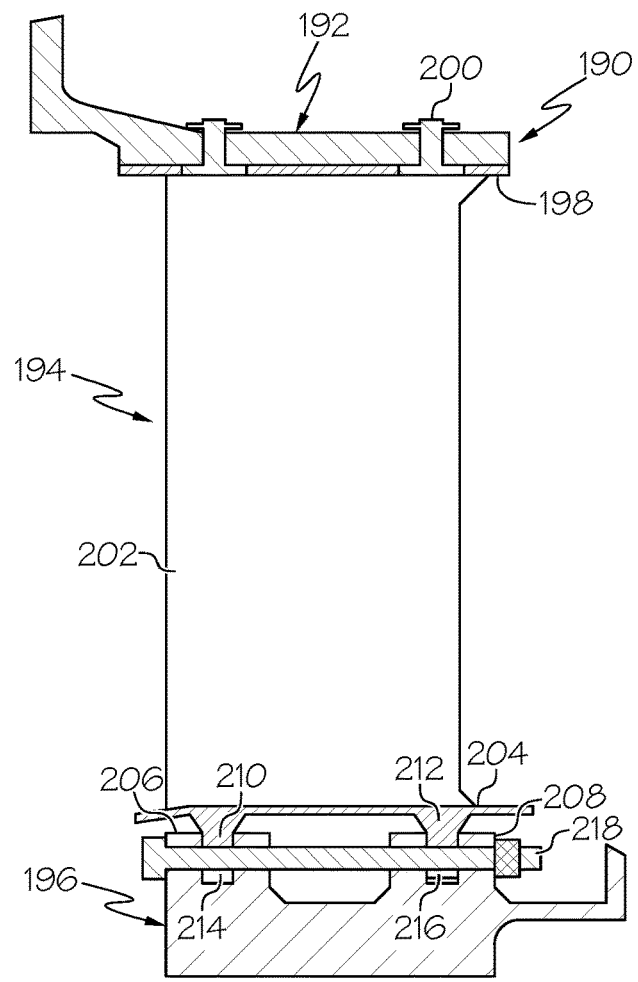
FIG. 11 is a diagrammatic, cross-sectional view of a portion of a torque frame, according to one or more embodiments shown and described herein.

FIG. 11 illustrates another embodiment of a portion of torque frame 190 including separable outer ring 192, structural member 194 and inner disk 196. In this example, the outer ring 192 is bolted to an outer tip plate 198 through its circumference by radially extending bolts 200. The structural member 194 includes an airfoil structure 202 with inner and outer tip plates 204 and 198, respectively, at opposite ends. Radially inside the inner tip plate 204 are radially extending mounting flanges 206 and 208. Tabs 210 and 212 extend radially outward from the inner tip plate 204 and are received within openings 214 and 216. An expandable bolt 218 is threaded through openings through the tabs 210 and 212.

Figure 12:
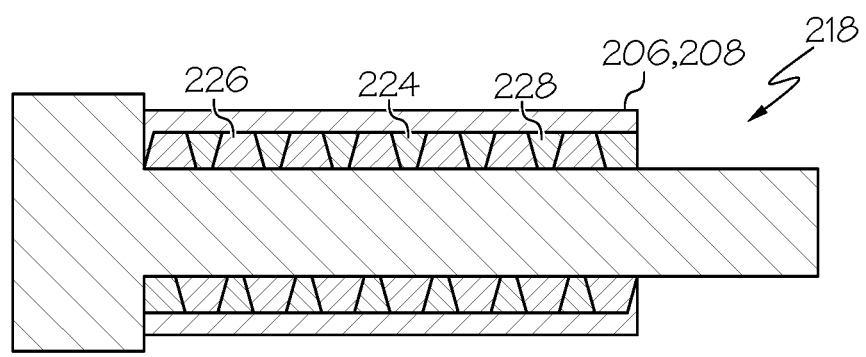
FIG. 12 is a diagrammatic section view of an expandable bolt the torque frame of FIG. 11 in a retracted configuration, according to one or more embodiments shown and described herein.
Figure 13:
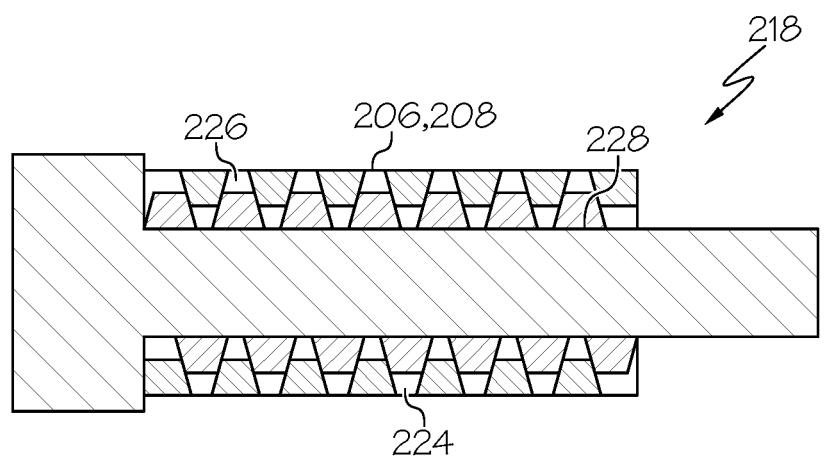
FIG. 13 is a diagrammatic section view of the expandable bolt of FIG. 12 in an expanded configuration, according to one or more embodiments shown and described herein.

Referring to FIGS. 12 and 13, the expandable bolt 218 is threaded through the openings 214, 216 and includes an expandable outer peripheral wall 224 that has a spiral groove 226 having a cross-sectional shape that is sized to receive rings 228 or threads. The rings 228 are shaped (e.g., trapezoidal) to engage the outer peripheral wall 224 within the groove 226 as the bolt 218 is torqued, which causes the outer peripheral wall to expand (FIG. 11) and further engage the mounting flanges 206, 208 and tabs 210, 212 creating a tighter fit between the structural member 194 and the inner disk 196.

Figure 14:
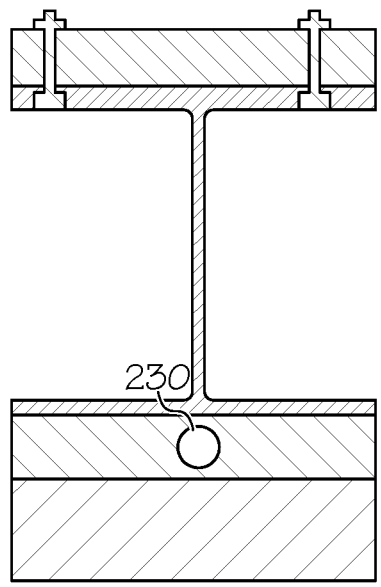
FIG. 14 is a diagrammatic front view of a portion of a torque frame, according to one or more embodiments shown and described herein.
Figure 15:
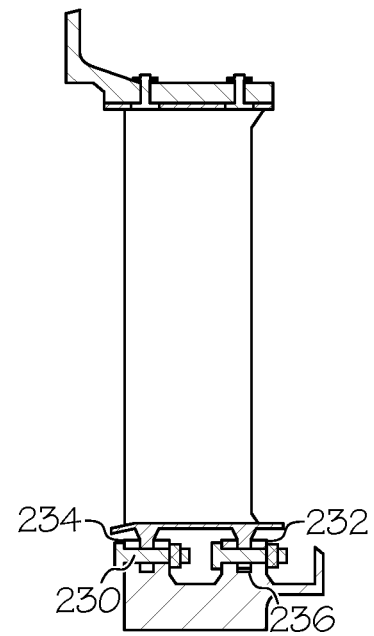
FIG. 15 is a diagrammatic cross-sectional view of the torque frame of FIG. 14, according to one or more embodiments shown and described herein.
Figure 16:
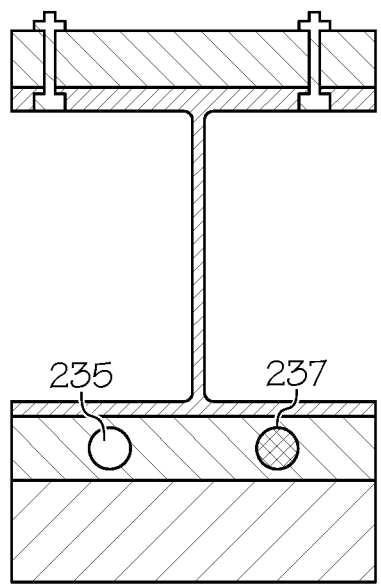
FIG. 16 is a diagrammatic front view of a portion of a torque frame, according to one or more embodiments shown and described herein.
Figure 17:
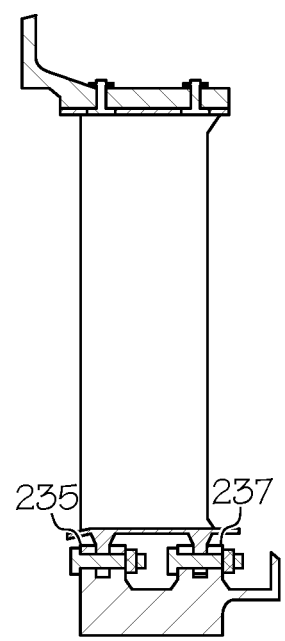
FIG. 17 is a diagrammatic cross-sectional view of the torque frame of FIG. 16, according to one or more embodiments shown and described herein.
Figure 18:
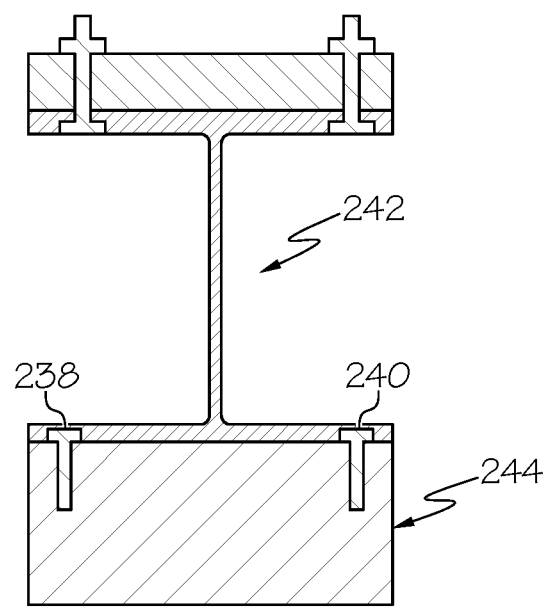
FIG. 18 is a diagrammatic front view of a portion of a torque frame, according to one or more embodiments shown and described herein.

Referring to FIGS. 14 and 15, while a single bolt 218 is illustrated by FIG. 11, multiple bolts 230 and 232 may be used (e.g., one for each mounting flange 234 and 236. FIG. 14 illustrates an embodiment in which the bolts 230 and 232 are aligned in the axial direction. FIGS. 16 and 17 illustrate an embodiment in which bolts 235 and 237 are offset in the axial direction. Any suitable alignment may be used including combinations of offset and aligned. Other configurations may utilize shear pins 243, 245 instead of bolts and/or radial bolts 238 and 240 between a structural member 242 and inner disk 244 (FIG. 18). Radially-extending bolts may be used.

Figure 19:
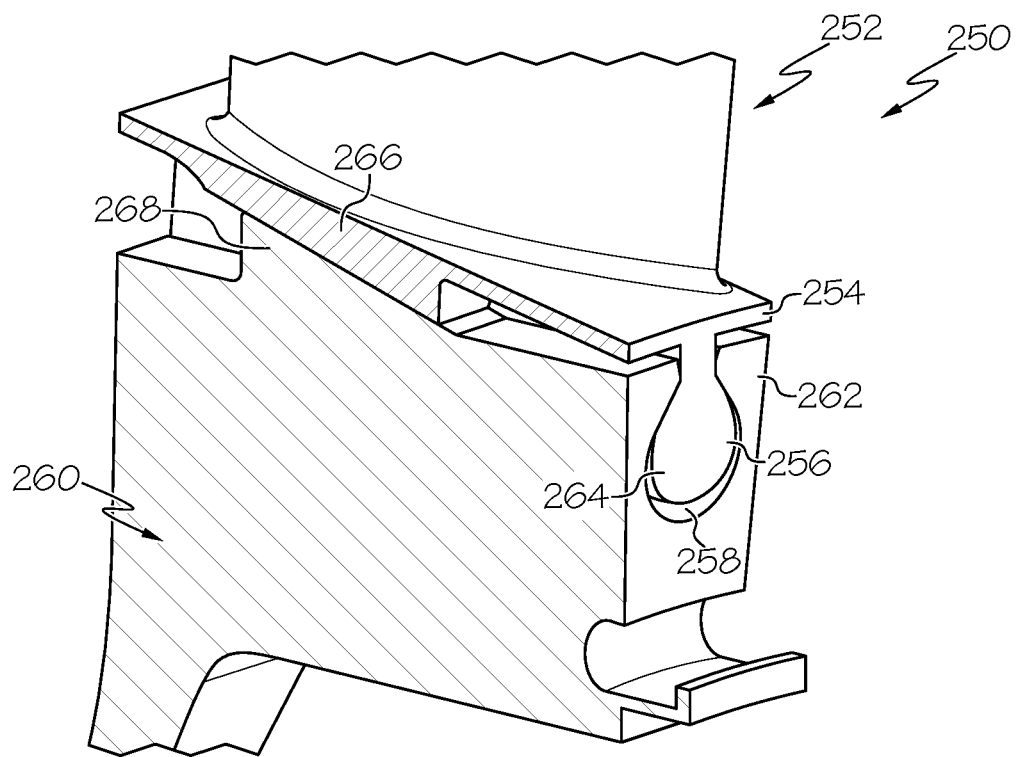
FIG. 19 is a diagrammatic cross-sectional view of a portion of a torque frame, according to one or more embodiments shown and described herein.
Figure 20:
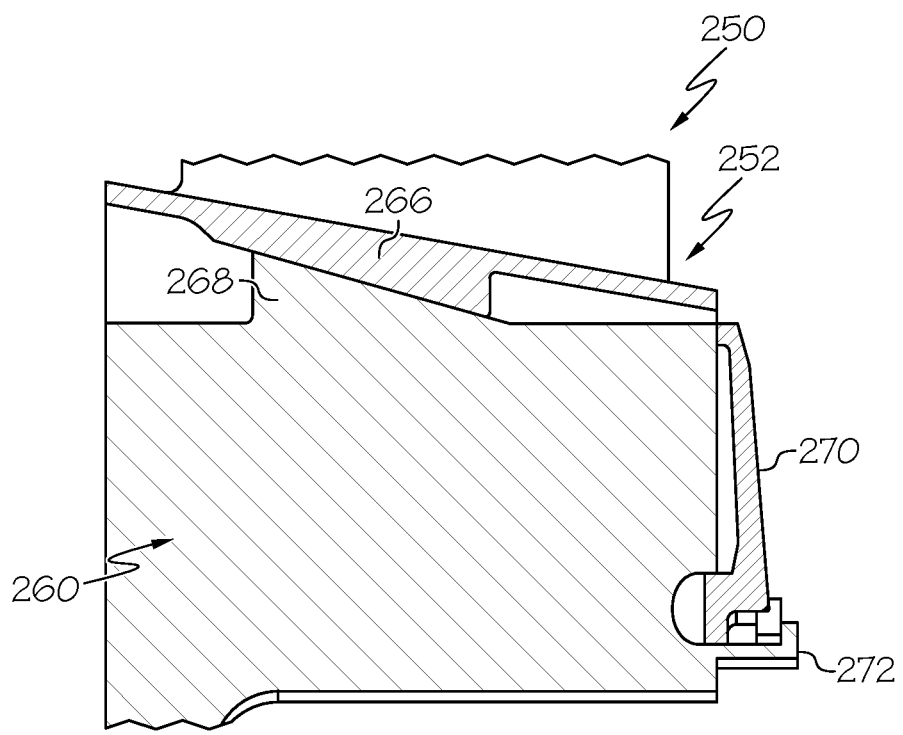
FIG. 20 is a diagrammatic view of a portion of the torque frame of FIG. 19, according to one or more embodiments shown and described herein.

Referring now to FIGS. 19 and 20, in some embodiments, a dovetail structure may be used to releasable connect structures together. Referring to FIG. 19, a portion of another torque frame 250 is illustrated that includes a structural member 252 that includes an inner tip plate 254 that includes a dovetail pin structure 256 with an enlarged portion that is received within a correspondingly shaped dovetail socket 258 of an inner disk 260. The dovetail pin structure 256 may be slid axially into the dovetail socket 258 such that the dovetail pin structure 256 is radially retained by a necked-down portion 262 of the dovetail socket 258 and an enlarged portion 264 of the dovetail pin structure 256.

As shown in FIGS. 19 and 20, in some embodiments, each of the inner tip plate 254 and the inner disk 260 may include mating wedges 266 and 268. As the dovetail pin structure 256 is slid axially into the dovetail socket 258, the wedges 266 and 268 engage and place a radial force on the dovetail pin structure 256 further binding the dovetail pin structure 256 within the dovetail socket 258 and pre-loading airfoil structures 274. Referring to FIG. 20, a retainer 270 may be used to further inhibit axial movement of the dovetail pin structure 256 out of the dovetail socket 258 until the retainer 270 is slid out of a mating flange 272 of the inner disk 260. While the wedges 266 and 268 are illustrated between the inner tip plate 254 and an outer surface of the inner disk 260 with the dovetail socket 258 extending axially, in other embodiments, the dovetail socket 258 may be angled in a radial direction thereby creating a wedge shape that can be used to provide a radial force on the structural member 252.

Figure 22:
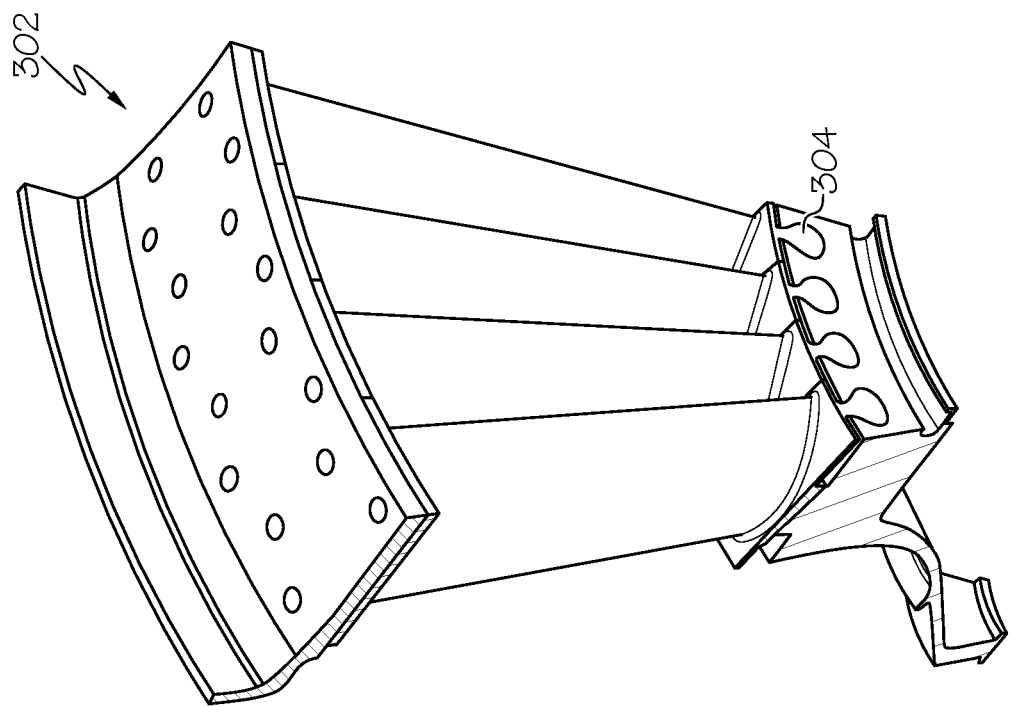
FIG. 22 is a diagrammatic cross-sectional side view of a portion of a torque frame, according to one or more embodiments shown and described herein.
Figure 21:
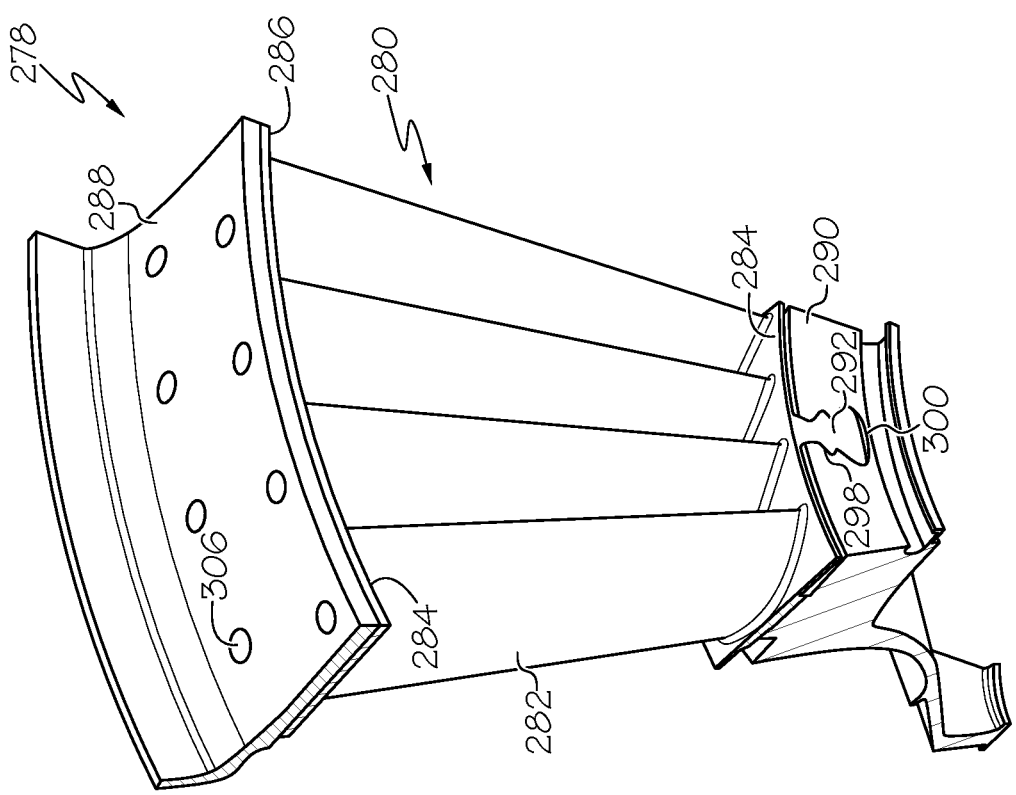
FIG. 21 is a diagrammatic cross-sectional side view of a portion of a torque frame, according to one or more embodiments shown and described herein.

Referring to FIG. 21, as mentioned above, a torque frame segment 278 may be provided with structural member 280 including multiple airfoil structures 282. In the illustrated example of FIG. 21, the structural member 280 includes airfoil structures 282 with inner and outer tip plates 284 and 286 at opposite ends with outer tip plate 286, as above, mounted to a 360 degree monolithic outer ring 288 and inner tip plate 284 mounted to an inner disk 290. A dovetail structure 292 along with wedge structures 294 are used to mount the structural member 280 to the inner disk 290 in a fashion similar to that described with reference to FIGS. 19 and 20. In this embodiment, a dovetail pin structure 296 includes multiple tangs 298 for attaching within dovetail socket 300. FIG. 22 illustrates a torque frame segment 302 with multiple dovetail structures 304.

The torque frame segments may include any suitable number of airfoil structures, such as between two and eight airfoil structures. A single torque frame segment extends about only a portion of the 360-degree outer ring, such as between about 10 degrees to about 90 degrees, such as between about 20 degrees and about 40 degrees.

Figure 23:
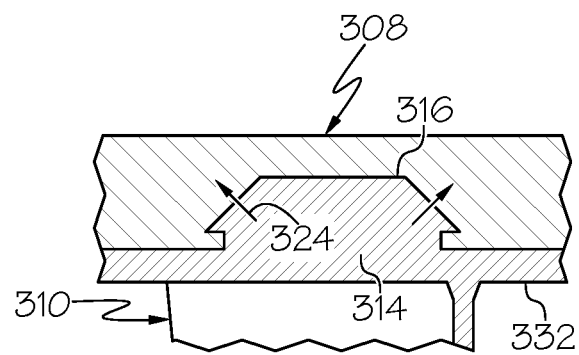
FIG. 23 is a diagrammatic cross-sectional side view of a portion of a torque frame, according to one or more embodiments shown and described herein.
Figure 24:
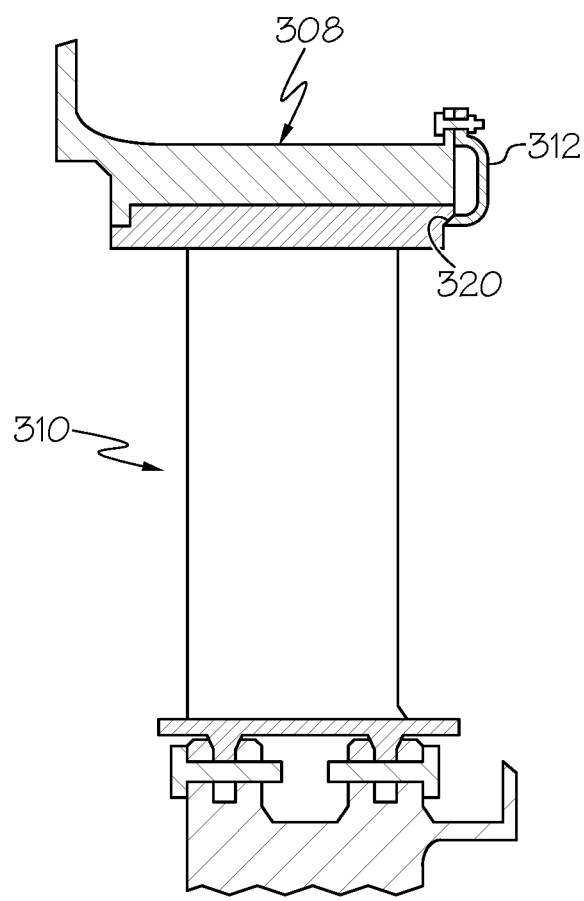
FIG. 24 is a diagrammatic cross-sectional side view of the torque frame of FIG. 23, according to one or more embodiments shown and described herein.
Figure 25:
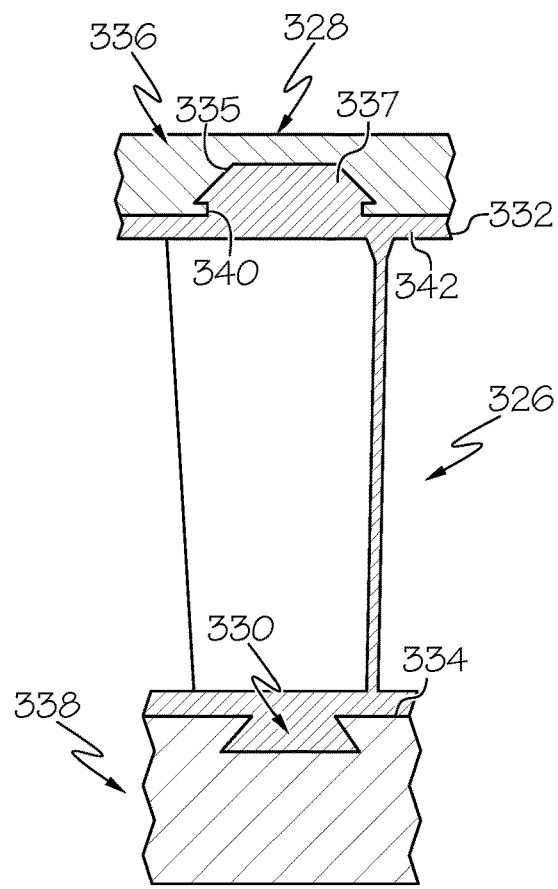
FIG. 25 is a diagrammatic cross-sectional side view of a portion of a torque frame, according to one or more embodiments shown and described herein.

In the embodiment of FIG. 21, the outer ring 288 is bolted onto the outer tip plate 286 using radially extending bolts 306. Other or additional mounting structures may be used, such as shown in the Figures above and also shown by FIGS. 23 and 24. In FIGS. 23 and 24, another dovetail pin structure 314 is used to releasably mount an outer ring 308 to a structural member 310. A retainer 312 may be used to lock the dovetail pin structure 314 within a dovetail socket 316. An end 318 of the retainer 312 may engage a taper portion 320 of the outer tip plate 332. As bolt 322 is tightened, the structural member 310 may be pushed against the outer ring 308 due to the force of the retainer 312 against the taper portion 320, as represented by arrows 324 of FIG. 23. FIG. 25 illustrates an embodiment where a structural member 326 includes dovetail structures 328 and 330 at both outer and inner tip plates 332 and 334 to connect to an outer ring 336 and inner disk 338. As with the dovetail structures described above, the dovetail structures 328 and 330 taper to provide pressure planes and taper in width to provide radial retention features 340 and 342.

Figure 26:
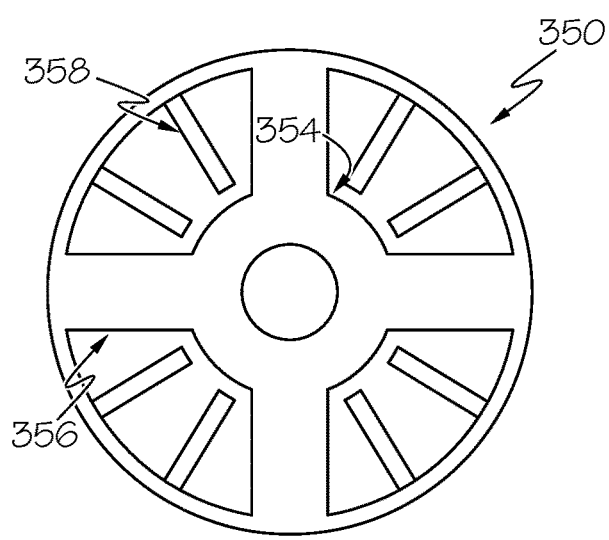
FIG. 26 is a diagrammatic front view of a portion of a torque frame, according to one or more embodiments shown and described herein.

Referring now to FIG. 26, a separable torque frame 350 includes an outer ring 352, an inner disk 354 and structural members 356. In some embodiments, the structural members 356 may be formed monolithically with the outer ring 352 and the inner disk 354 to provide radial and circumferential support for the torque frame 350. The structural members 356 may be formed separately from the outer ring 352 and the inner disk 354 and be connected thereto by releasable connecting structures, such as any of the releasable connecting structures discussed above.

Figure 27:
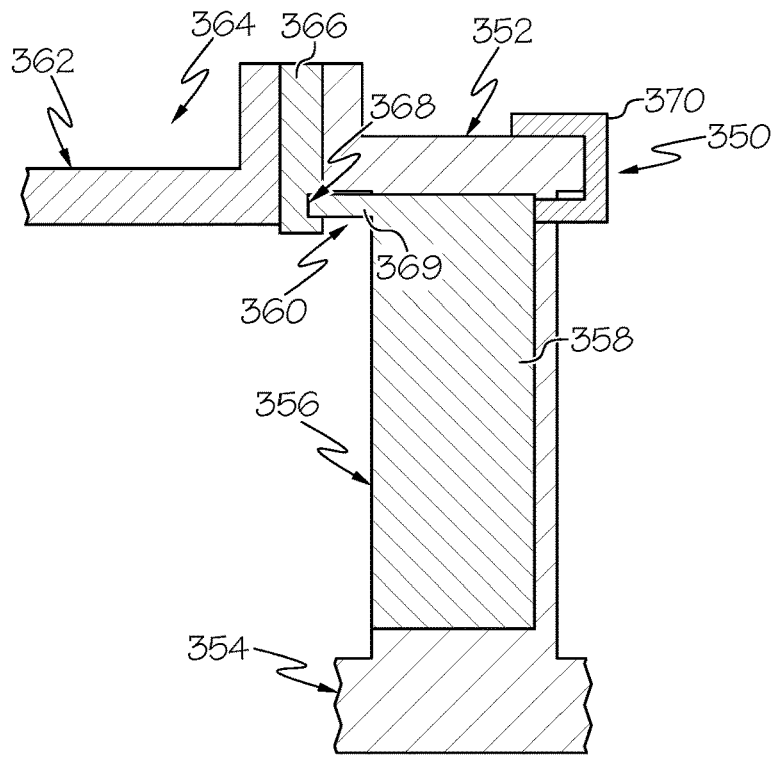
FIG. 27 is a diagrammatic cross-sectional side view of a torque frame attached to an outer drum, according to one or more embodiments shown and described herein.

The torque frame 350 further includes a plurality of airfoil structures 358. The airfoil structures 358 are formed separately from the outer ring 352 and the inner disk 354 and are connected to the outer ring 352 by releasable connecting structures 360 (FIG. 27). The airfoil structures 358 extend radially inward toward the inner disk 354 and, in the illustrated example, terminate radially outward from the inner disk 354. In this regard, the airfoil structures 358 may be used primarily for torque generation and airflow management rather than to provide structural support for the overall torque frame 350. The structural members 356 may or may not include airfoil structures.

Referring to FIG. 27, a diagrammatic section view of the torque frame 350 is illustrated and includes the outer ring 352, inner disk 354 and structural members 356. The outer ring 352 is illustrated connected to an outer drum 362 of a LP turbine rotor assembly 364. A connector disk 366 may be located between the outer drum 362 and the outer ring 352. The connector disk 366 may include a slot 368 or other connecting structure into which the airfoil structure 358 may be slidably and removably received. In some embodiments, the connector disk 366 may be formed separately from the outer drum 362 and outer ring 352 and connected thereto by and suitable connection. In other embodiments, the connector disk 366 may be an integral, monolithic part of the outer drum 362 and/or outer ring 352.

A connector portion 369 of the airfoil structure 358 may be slid axially into the slot 368. In the illustrated embodiment, an axial retention feature 370 may be used as a clip that clips one or more of the airfoil structures 358 to the outer ring 352 and inhibits axial movement of the airfoil structures 358 away from the connector disk 366. In this regard, the airfoil structures 358 may be axially constrained by the retention feature 370 and radially constrained by the connector disk 366 and the outer ring 352. Dovetail structures, such as any of those shown and described above, or other suitable connecting structures may be used to constrain the airfoil structures both axially and radially.

Figure 28:
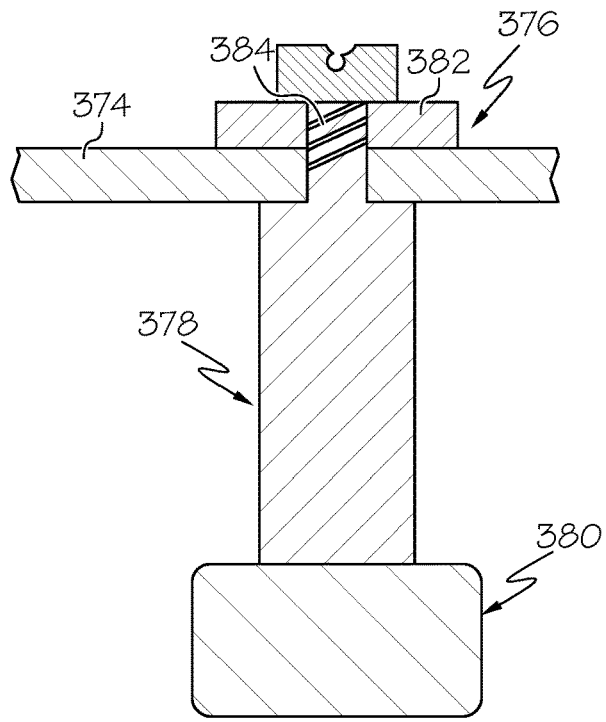
FIG. 28 is a diagrammatic view of a portion of a torque frame, according to one or more embodiments shown and described herein.
Figure 29:
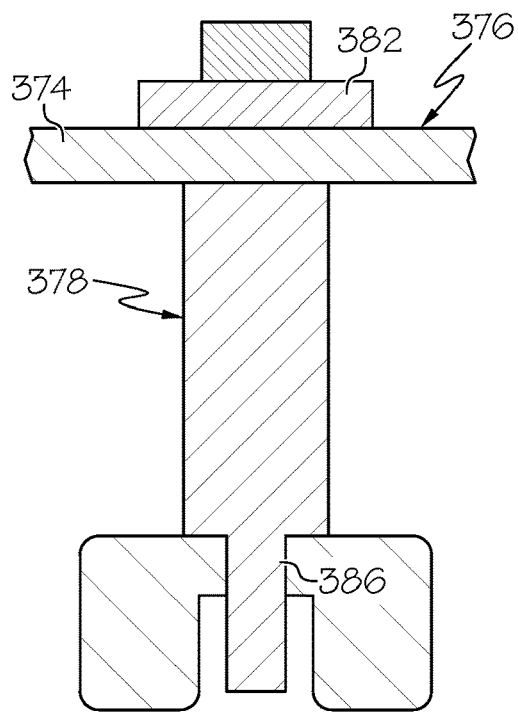
FIG. 29 is another diagrammatic view of the portion of the torque frame of FIG. 28, according to one or more embodiments shown and described herein.

Referring briefly to FIG. 28, as mentioned above, an outer drum 374 may have a portion that forms an outer ring 376. In these embodiments, a structural member 378, rather than be monolithic with the outer ring, may be bolted or otherwise connected to (e.g., through dovetail structures) to the outer ring 376 and an inner disk 380. In the illustrated example, a boss structure 382 may be provided through which a radially-extending bolt 384 is threaded to aid in fastening the structural member 378 to the outer ring 376. Referring to FIG. 29, another radially-extending bolt 386 may be used to fasten the structural member 378 to the inner disk 380.

Figure 30:
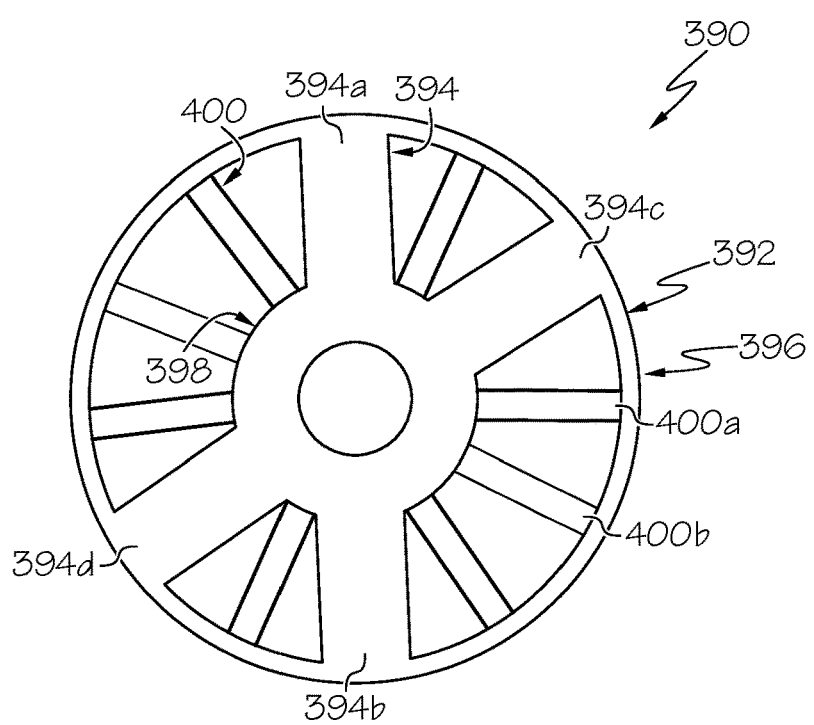
FIG. 30 is a diagrammatic view of a torque frame, according to one or more embodiments shown and described herein.

Referring now to FIG. 30, use of a separable torque frame 390 with both a support frame 392 with structural members 394 formed monolithically with outer and inner rings 396 and 398 can allow for placement of separately formed airfoil structures 400 at desired locations and arrangement depending, at least in part, on airfoil mass and geometry to promote mistuning and reduce flutter phenomena. As an example, in FIG. 30, structural members 394a and 394b are located at 12 o'clock and 6 o'clock, respectively, and structural members 394c and 394d are located at 2 o'clock and 8 o-clock, respectively. Airfoil structures 400a of a certain mass and geometry are located at 1, 3, 5, 7, 9, 11 o'clock while airfoil structures 400b of a different mass and/or geometry are located at 4 o'clock and 10 o'clock. Because the airfoil structures 400 are separable from the outer ring 396, the airfoil structures 400 may be rearranged and replaced using their releasable connections as described with any of the embodiments described above. Further, it is possible to have no cyclic symmetric patterns of adjacent blades as shown with different natural frequencies.

Figure 31:
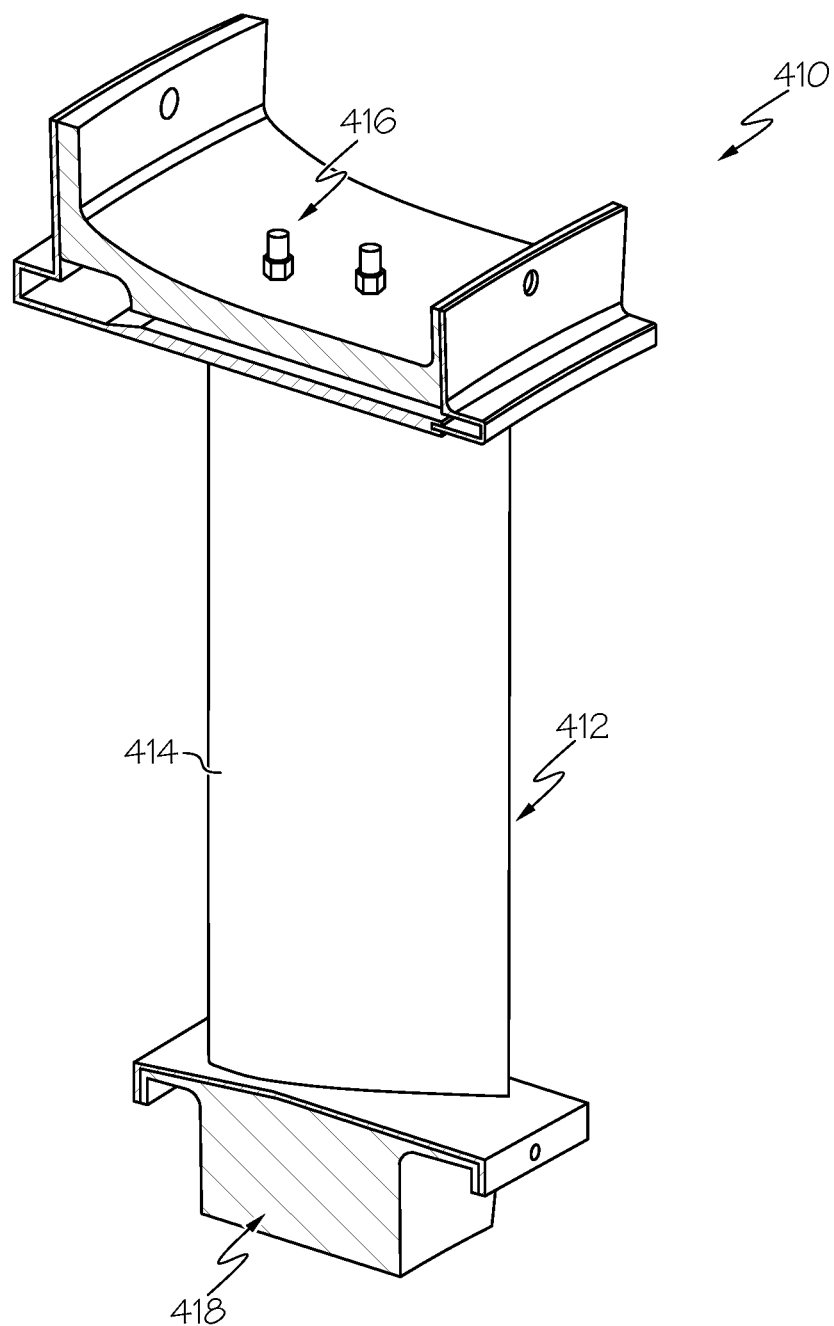
FIG. 31 is a diagrammatic cross-sectional perspective view of a portion of a torque frame, according to one or more embodiments shown and described herein.

Referring to FIG. 31, a partial, cross-sectional view of a separable torque frame 410 includes a fairing structure 412 that at least partially surrounds a structural member 414. Because the structural members 414 are formed separately from outer ring 416 and inner disk 418, the fairing structure 412 may be placed around the structural member 414 and then affixed to the outer ring 416 and the inner disk 418. As used herein, a "fairing structure" refers to a skin that at least partially surrounds a structural member that is a different cross-sectional shape than the structural member housed within the fairing structure. The fairing structure allows the structural member to be any cross-sectional shape and enhances the flow dynamics of the structural member. The fairing structure 412 may be a same or a different material than the structural member 414. In some embodiments, the fairing structure 412 is removable from the structural member 414, e.g., for servicing only the fairing. The fairing structure 412 may be a wall thickness that is substantially constant or different at selected locations. For example, it may be desirable to increase the wall thickness at a leading edge of the fairing structure 412.

Figure 32:
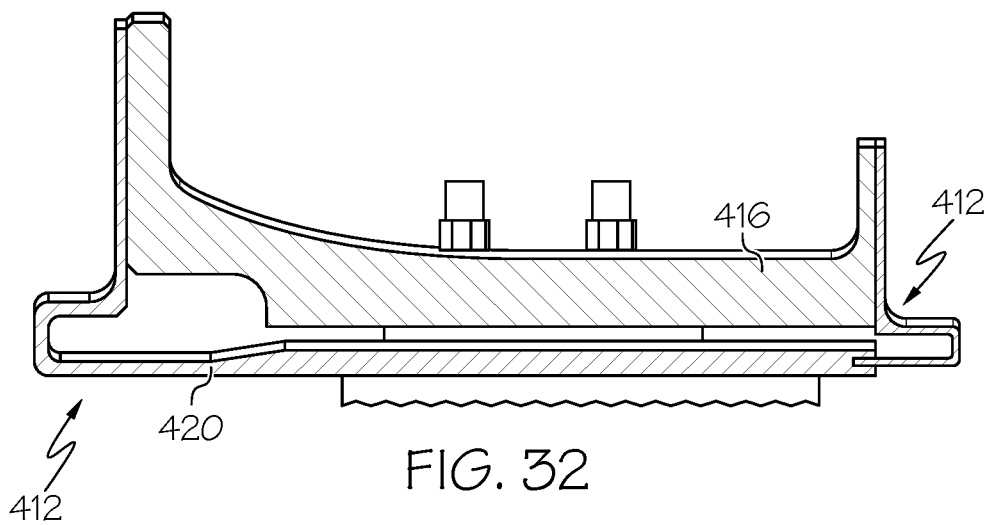
FIG. 32 is a diagrammatic cross-sectional view of a portion of the torque frame of FIG. 31, according to one or more embodiments shown and described herein.
Figure 33:
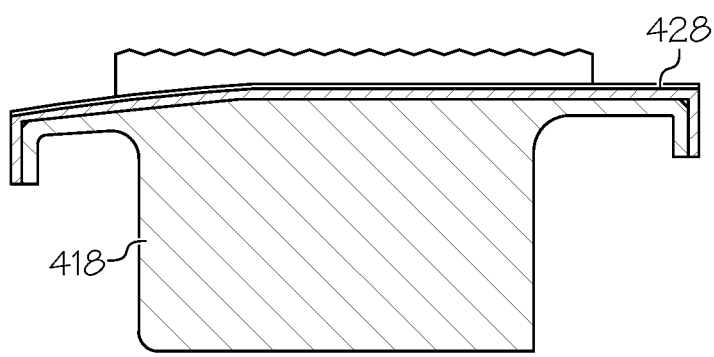
FIG. 33 is a diagrammatic cross-sectional view of a portion of the torque frame of FIG. 31, according to one or more embodiments shown and described herein.

Referring to FIG. 32, any suitable mounting structures can be used to mount the fairing structure 412 to the structural member 414, outer ring 416 and inner disk 418. FIG. 32 illustrates a "soft" connection in which a tip plate 420 of the fairing structure 412 is spaced from the outer ring 416 of the structural member 414. This spacing can allow for thermal growth of the fairing structure 412 during operation. A retainer 424 may be used to inhibit axial movement of the fairing structure 412 in a fashion similar to that described above. FIG. 33 illustrates a "hard" connection where an inner tip plate 428 of the fairing structure 412 is mounted directly to the inner disk 418.

Figure 34:
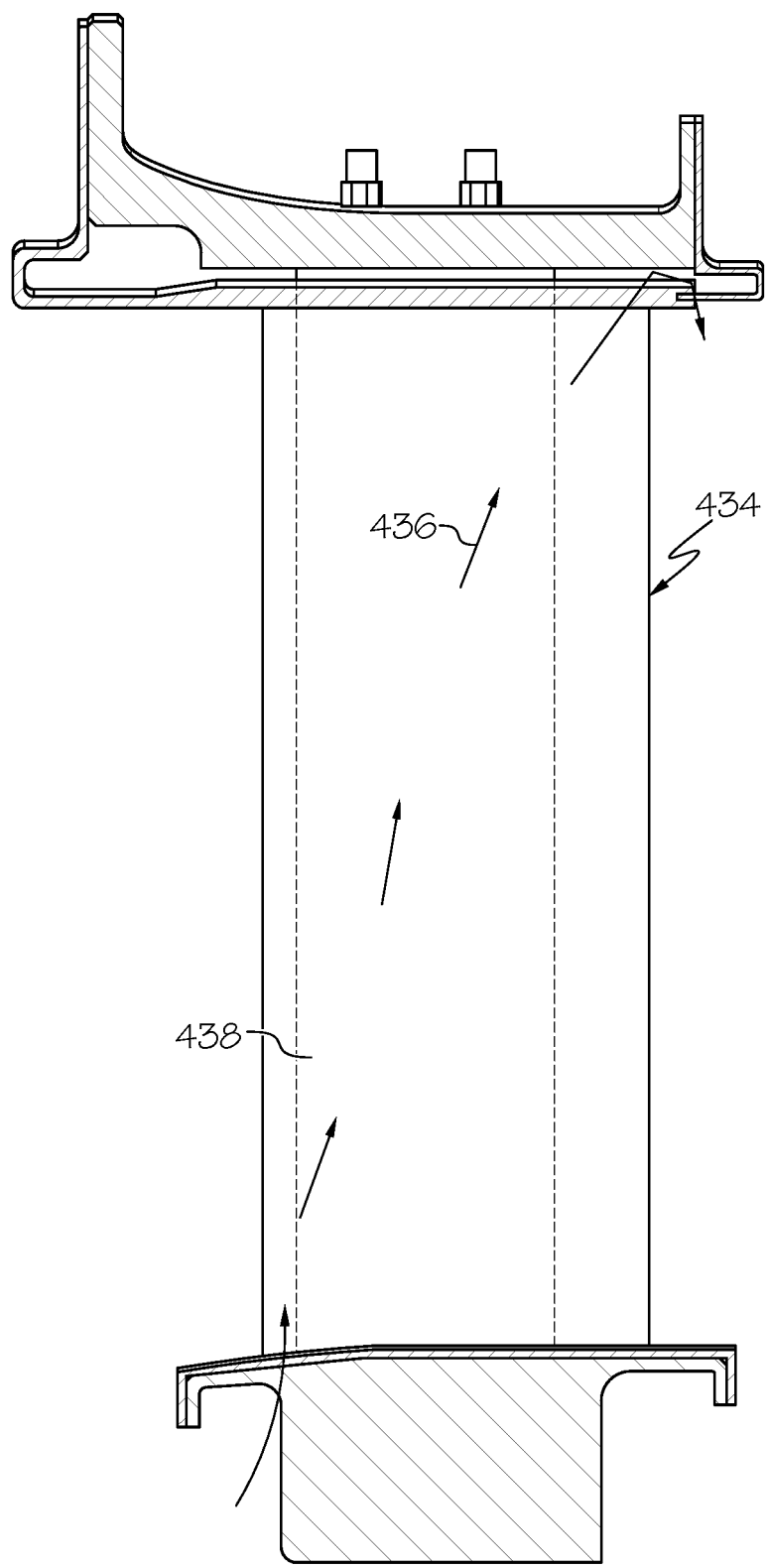
FIG. 34 is a diagrammatic, cross-sectional view of a portion of a torque frame, according to one or more embodiments shown and described herein.
Figure 35:
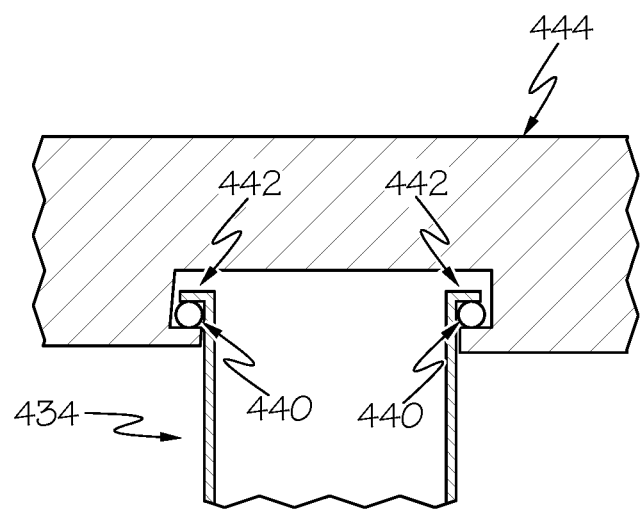
FIG. 35 is a diagrammatic, cross-sectional view of a portion of a torque frame including seals, according to one or more embodiments shown and described herein.
Figure 36:
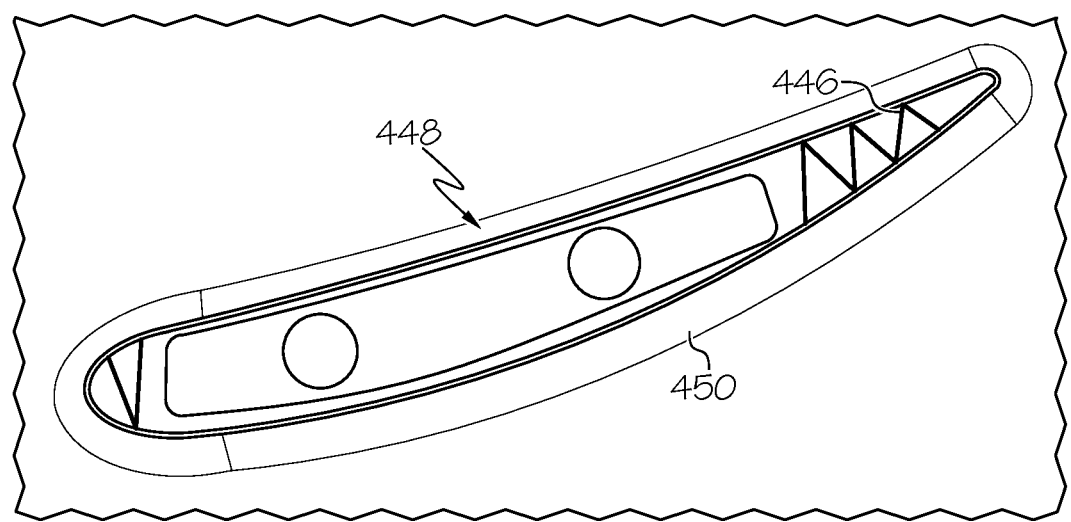
FIG. 36 is a diagrammatic, cross-sectional view of a portion of a structural member for a torque frame including stiffeners, according to one or more embodiments shown and described herein.
Figure 37:
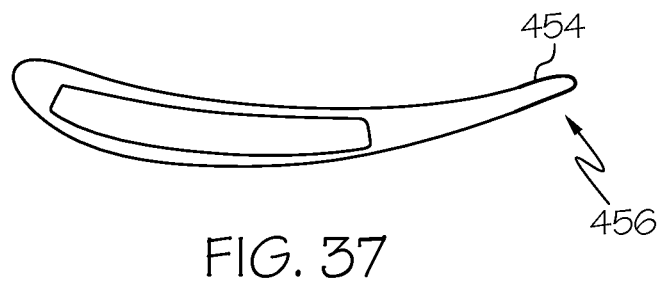
FIG. 37 is a diagrammatic, cross-sectional view of a portion of a structural member for a torque frame, according to one or more embodiments shown and described herein.
Figure 38:
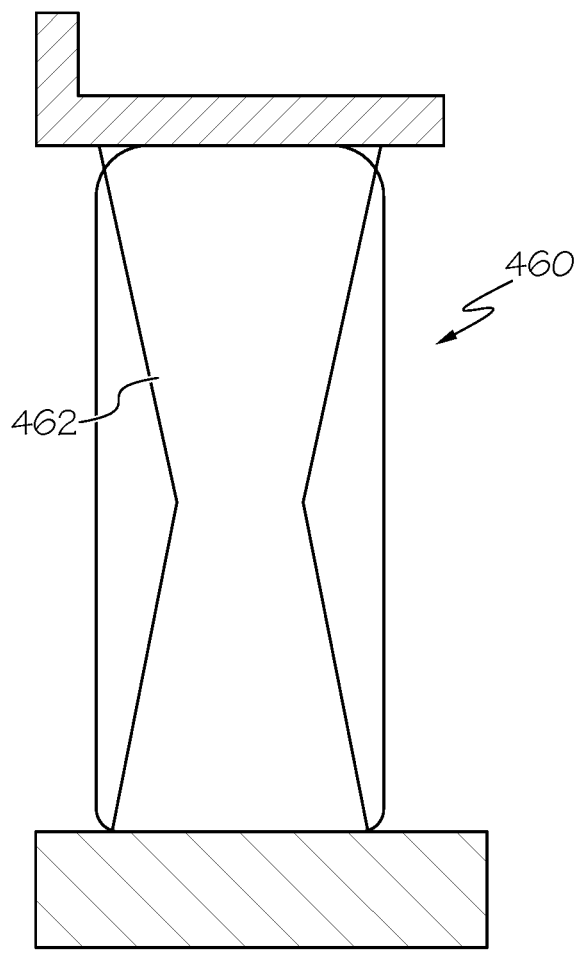
FIG. 38 is a diagrammatic, cross-sectional view of a portion of a torque frame, according to one or more embodiments shown and described herein.

Referring to FIG. 34, fairing structures 434 can be sized and shaped to allow for airflow 436 through an interior of the fairing structures 434, between the fairing structures 434 and structural members 438 located therein. Referring to FIG. 35, seals 440 may be provided to control airflow through the fairing structures 434 and a gap 442 may be provided between the fairing structures 434 and outer ring 444 to provide a soft connection for thermal growth. Referring to FIG. 36, stiffeners 446 may be placed inside cavities 448 of fairing structures 450 to avoid panel modes that contribute to overall noise level and to strengthen for pressure loads. Referring to FIG. 37, fairing structures 452 may be formed of multiple parts, such as an edge cap 454 located at a trailing edge 456 of the fairing structure 452. Referring to FIG. 38, as mentioned above, fairing structures 460 may form airfoil structures out of structural members 462 located therein. In this way, the structural members 462 may have any suitable structural shape and the fairing structures 460 may have an aerodynamic shape.

Figure 39:
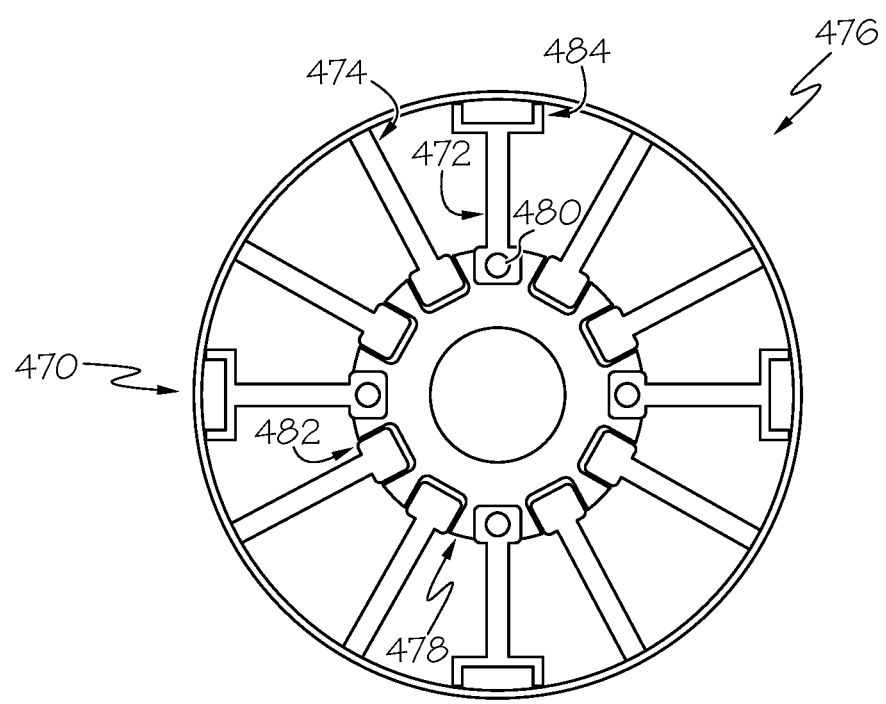
FIG. 39 is a diagrammatic view of a torque frame, according to one or more embodiments shown and described herein.

Referring to FIG. 39, any combination of the above-described connection structures may be used to connect structural members and airfoil structures to an outer ring and inner disk to form separable torque frames. In this example, a torque frame 470 includes structural members 472 and 474 that are connected to outer ring 476 and inner disk 478. The structural members 472 may be primary structural members 472 that provide primary structural support for the overall torque frame 470 and may be bolted to the inner disk 478 using any of the techniques described above, such as axial bolts 480. The structural members 474 may include airfoil structures and may be connected to the inner disk 478 using any of the techniques described above, such as dovetail structures 482. In this embodiment, the structural members 472 include a relatively flexible attachment 484 at outer ring 476 that deflects radially with operating loads to allow the dovetail structures 482 to engage pressure planes. In some embodiments, the dovetail structures described herein may utilize spacers between the dovetail pins and grooves to allow the dovetail structures to engage their pressure planes.

The above-described separable torque frames are formed of separable components that facilitate manufacture and separation of the torque frame components, for example, for repair or replacement of only one or more components of concern, rather than removing and replacing the entire torque frame. Further, because the components (outer ring, structural members and inner disk) are separately formed and connected together, operational stress can be better tolerated and crack propagation can be reduced compared to single-piece, monolithic torque frames. Use of axial dovetail structures can provide added surface area for load transfer and reduce mechanical stresses. Hybrid connection structures can be used to provide the structural members with different modes of attachment and greater manufacturing flexibility. Fairing structures can be used to protect the structural members and provide aerodynamic shapes.

As used herein, the singular forms "a," "an" and "the" include plural referents unless the context clearly dictates otherwise. Thus, for example, reference to "a" component includes aspects having two or more such components, unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. The term "about" may include any values within ten percent of a particular value, such as within five percent of a particular value, such as within two percent of a particular value, such as within one percent of a particular value.

Directional terms as used herein—for example up, down, right, left, front, back, top, bottom, upper, lower,—are made only with reference to the figures as drawn and are not intended to imply absolute orientation unless otherwise expressly stated. The terms "axial" and "longitudinal" both refer to a direction that is parallel to a centerline the gas turbine engine, while "radial" refers to a direction perpendicular to the longitudinal direction. The terms "tangential" and "circumferential" refer to a direction mutually perpendicular to both the radial and longitudinal directions. The terms "forward" or "front" refer to a location upstream in airflow passing through or around a component during operation, and the terms "aft" or "rear" refer to a location downstream during operation. These directional terms are used merely for convenience in the description and also do not require a particular orientation of the structures described thereby.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Further aspects are provided by the subject matter in the following clauses:

Clause 1: A gas turbine engine comprising: a fan located at a forward portion of the gas turbine engine; a compressor section and a turbine section are arranged in serial flow order, the compressor section and the turbine section together defining a core airflow path; a rotary member rotatable with the fan and with a low pressure turbine of the turbine section; the low pressure turbine comprising a rotating drum to which a first airfoil structure is connected and extends radially inward toward the rotary member; and a torque frame that connects the rotating drum to the rotary member and transfers torque from the airfoil structure mounted to the rotating drum to the rotary member, the torque frame comprising: an inner disk mounted to the rotary member; an outer ring; and a second airfoil structure formed separately from the outer ring and connected thereto by a releasable connecting structure, the second airfoil structure extending radially inward from the outer ring toward the inner disk.

Clause 2: The gas turbine engine of clause 1, wherein the low pressure turbine comprises a high speed turbine and a counter-rotating low speed turbine.

Clause 3: The gas turbine engine of any of the above clauses, wherein the low speed turbine comprises the rotating drum and the torque frame.

Clause 4: The gas turbine engine of any of the above clauses, wherein the another airfoil structure is part of a structural member that is formed separately from the outer ring and inner disk, wherein the structural member is releasably connected to the outer ring and the inner disk.

Clause 5: The gas turbine engine of any of the above clauses, wherein the outer ring is formed as a single monolithic piece.

Clause 6: The gas turbine engine of any of the above clauses, wherein the structural member comprises an outer tip plate that engages the outer ring and an inner tip plate that engages the inner disk.

Clause 7: The gas turbine engine of any of the above clauses, wherein the connecting structure comprises an attachment tab that projects radially outward from the outer tip plate, the attachment tab configured to receive a bolt that connects the attachment tab to the outer ring.

Clause 8: The gas turbine engine of any of the above clauses, wherein the attachment tab extends through an opening in the outer ring that is adjacent a stud that extends radially outward from the outer ring, the stud configured to receive the bolt that connects the attachment tab to the stud.

Clause 9: The gas turbine engine of any of the above clauses, wherein an elongated axis of the bolt extends in a tangential direction with respect to the outer ring.

Clause 10: The gas turbine engine of any of the above clauses, wherein an elongated axis of the bolt extends in an axial direction relative to the outer ring.

Clause 11: The gas turbine engine of any of the above clauses, wherein the outer ring is connected to the outer tip plate by a bolt having an elongated axis that extends radially through the outer ring and into the outer tip plate.

Clause 12: The gas turbine engine of any of the above clauses, wherein a mounting flange extends radially inward from the inner tip plate, the mounting flange of the inner tip plate configured to receive a bolt that connects the mounting flange of the inner disk.

Clause 13: The gas turbine engine of any of the above clauses, wherein the inner disk comprises a corresponding mounting flange configured to receive the bolt that connects the mounting flange of the outer tip plate to the corresponding mounting flange of the inner disk.

Clause 14: The gas turbine engine of any of the above clauses, wherein the bolt comprises an expandable outer peripheral wall.

Clause 15: The gas turbine engine of any of the above clauses, wherein a dovetail structure releasably connects the second airfoil structure and the inner disk.

Clause 16: The gas turbine engine of any of the above clauses, wherein the dovetail structure comprises a dovetail pin structure with an enlarged head portion that extends radially outward from the inner tip plate and a dovetail socket that is formed in the inner disk that receives the dovetail pin structure.

Clause 17: The gas turbine engine of any of the above clauses further comprising a retainer that is mounted to the inner disk and extends over the dovetail socket thereby inhibiting axial movement of the dovetail pin structure.

Clause 18: The gas turbine engine of any of the above clauses, wherein the connecting structure comprises a dovetail structure.

Clause 19: The gas turbine engine of any of the above clauses, wherein the dovetail structure comprises a dovetail pin with an enlarged head portion that extends radially outward from the outer tip plate and a dovetail socket that is formed in the outer ring that receives the dovetail structure.

Clause 20. The gas turbine engine of any of the above clauses further comprising a structural member extending from the outer ring to the inner disk, the structural member being integrally formed with the outer ring and the inner disk.

Clause 21: The gas turbine engine of any of the above clauses further comprising a fairing structure that at least partially covers the structural member.

Clause 22: A torque frame for a gas turbine engine that connects a rotating drum to a rotary member and transfers torque from an airfoil structure mounted to the rotating drum to the rotary member, the torque frame comprising: an inner disk configured to mount to the rotary member; an outer ring; and an airfoil structure formed separately from the outer ring and configured to connect to the outer ring by a releasable connecting structure such that the airfoil structure extends radially inward from the outer ring toward the inner disk.

Clause 23: The torque frame of any of the above clauses, wherein the airfoil structure is part of a structural member that is formed separately from the outer ring and inner disk, wherein the structural member is releasably connected to the outer ring and the inner disk.

Clause 24: The torque frame of any of the above clauses, wherein the outer ring is formed as a single monolithic piece.

Clause 25: The torque frame of any of the above clauses, wherein the structural member comprises an outer tip plate that engages the outer ring and an inner tip plate that engages the inner disk.

Clause 26: The torque frame of any of the above clauses, wherein the connecting structure comprises an attachment tab that projects radially outward from the outer tip plate, the attachment tab configured to receive a bolt that connects the attachment tab to the outer ring.

Clause 27: The torque frame of any of the above clauses, wherein the attachment tab extends through an opening in the outer ring that is adjacent a stud that extends radially outward from the outer ring, the stud configured to receive the bolt that connects the attachment tab to the stud.

Clause 28: The torque frame of any of the above clauses, wherein an elongated axis of the bolt extends in a tangential direction with respect to the outer ring.

Clause 29: The torque frame of any of the above clauses, wherein an elongated axis of the bolt extends in an axial direction relative to the outer ring.

Clause 30: The torque frame of any of the above clauses, wherein the outer ring connects to the outer tip plate by a bolt having an elongated axis that extends radially through the outer ring and into the outer tip plate.

Clause 31: The torque frame of any of the above clauses, wherein a mounting flange extends radially outward from the inner tip plate, the mounting flange of the inner tip plate configured to receive a bolt that connects the mounting flange of the inner disk.

Clause 32: The torque frame of any of the above clauses, wherein the inner disk comprises a corresponding mounting flange configured to receive the bolt that connects the mounting flange of the outer tip plate to the corresponding mounting flange of the inner disk.

Clause 33: The torque frame of any of the above clauses, wherein the bolt comprises an expandable outer peripheral wall.

Clause 34: The torque frame of any of the above clauses, wherein a dovetail structure releasably connects the airfoil structure and the inner disk.

Clause 35: The torque frame of any of the above clauses, wherein the dovetail structure comprises a dovetail pin structure that extends radially outward from the inner tip plate and a dovetail socket that is formed in the inner disk that receives the dovetail pin structure.

Clause 36: The torque frame of any of the above clauses further comprising a retainer that is mounted to the inner disk and extends over the dovetail socket thereby inhibiting axial movement of the dovetail pin structure.

Clause 37: The torque frame of any of the above clauses, wherein the connecting structure comprises a dovetail structure.

Clause 38: The torque frame of any of the above clauses, wherein the dovetail structure comprises a dovetail pin that extends radially outward from the outer tip plate and a dovetail socket that is formed in the outer ring that receives the dovetail structure.

Clause 39: The torque frame of any of the above clauses further comprising a structural member extending from the outer ring to the inner disk, the structural member being integrally formed with the outer ring and the inner disk.

Clause 40: The torque frame of any of the above clauses further comprising a fairing structure that at least partially covers the structural member.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A gas turbine engine comprising:
   a fan located at a forward portion of the gas turbine engine;
   a compressor section and a turbine section arranged in serial flow order, the compressor section and the turbine section together defining a core airflow path;
   a rotary member rotatable with the fan and with a low pressure turbine of the turbine section;
   the low pressure turbine comprising a rotating drum to which a first airfoil structure is connected and extends radially inward toward the rotary member; and
   a torque frame that connects the rotating drum to the rotary member and transfers torque from the first airfoil structure mounted to the rotating drum to the rotary member, the torque frame comprising:
   an inner disk mounted to the rotary member;
   an outer ring formed as a single monolithic piece; and
   a second airfoil structure formed separately from the outer ring and connected thereto by a releasable connecting structure configured to extend radially through an outer face of the outer ring, the second airfoil structure extending radially inward from the outer ring toward the inner disk;
   wherein the second airfoil structure is part of a structural member that is formed separately from the outer ring and inner disk, the structural member is releasably connected to the outer ring and the inner disk and comprises an outer tip plate that engages the outer ring and an inner tip plate that engages the inner disk;
   wherein the releasable connecting structure comprises an attachment tab that projects radially outward from the outer tip plate, the attachment tab configured to receive a bolt that connects the attachment tab to the outer ring.

2. The gas turbine engine of claim 1, wherein the low pressure turbine comprises a high speed turbine and a counter-rotating low speed turbine.

3. The gas turbine engine of claim 2, wherein the low speed turbine comprises the rotating drum and the torque frame.

4. The gas turbine engine of claim 1, wherein the attachment tab extends through an opening in the outer ring that is adjacent a stud that extends radially outward from the outer ring, the stud configured to receive the bolt that connects the attachment tab to the stud.

5. The gas turbine engine of claim 4, wherein an elongated axis of the bolt extends in a tangential direction with respect to the outer ring.

6. The gas turbine engine of claim 4, wherein an elongated axis of the bolt extends in an axial direction relative to the outer ring.

7. A gas turbine engine comprising:
   a fan located at a forward portion of the gas turbine engine;
   a compressor section and a turbine section arranged in serial flow order, the compressor section and the turbine section together defining a core airflow path;
   a rotary member rotatable with the fan and with a low pressure turbine of the turbine section;
   the low pressure turbine comprising a rotating drum to which a first airfoil structure is connected and extends radially inward toward the rotary member; and
   a torque frame that connects the rotating drum to the rotary member and transfers torque from the first airfoil structure mounted to the rotating drum to the rotary member, the torque frame comprising:
   an inner disk mounted to the rotary member;
   an outer ring formed as a single monolithic piece; and
   a second airfoil structure formed separately from the outer ring and connected thereto by a releasable connecting structure configured to extend radially through an outer face of the outer ring, the second airfoil structure extending radially inward from the outer ring toward the inner disk;
   wherein the second airfoil structure is part of a structural member that is formed separately from the outer ring and inner disk, the structural member is releasably connected to the outer ring and the inner disk and comprises an outer tip plate that engages the outer ring and an inner tip plate that engages the inner disk;
   wherein the outer ring is connected to the outer tip plate by a bolt having an elongated axis that extends radially through the outer ring and into the outer tip plate.

8. A gas turbine engine comprising:
   a fan located at a forward portion of the gas turbine engine;
   a compressor section and a turbine section arranged in serial flow order, the compressor section and the turbine section together defining a core airflow path;
   a rotary member rotatable with the fan and with a low pressure turbine of the turbine section;

the low pressure turbine comprising a rotating drum to which a first airfoil structure is connected and extends radially inward toward the rotary member; and a torque frame that connects the rotating drum to the rotary member and transfers torque from the first airfoil structure mounted to the rotating drum to the rotary member, the torque frame comprising:

an inner disk mounted to the rotary member;

an outer ring formed as a single monolithic piece; and a second airfoil structure formed separately from the outer ring and connected thereto by a releasable connecting structure configured to extend radially through an outer face of the outer ring, the second airfoil structure extending radially inward from the outer ring toward the inner disk;

wherein the second airfoil structure is part of a structural member that is formed separately from the outer ring and inner disk, the structural member is releasably connected to the outer ring and the inner disk and comprises an outer tip plate that engages the outer ring and an inner tip plate that engages the inner disk;

wherein a mounting flange extends radially inward from the inner tip plate, the mounting flange of the inner tip plate configured to receive a bolt that connects the mounting flange of the inner disk.

9. The gas turbine engine of claim 8, wherein the inner disk comprises a corresponding mounting flange configured to receive the bolt that connects the mounting flange of the outer tip plate to the corresponding mounting flange of the inner disk.

10. The gas turbine engine of claim 8, wherein the bolt comprises an expandable outer peripheral wall.

* * * * *